(12) United States Patent
Mishra et al.

(10) Patent No.: US 12,250,325 B2
(45) Date of Patent: Mar. 11, 2025

(54) METHOD AND ARCHITECTURE FOR SECURING AND MANAGING NETWORKS OF EMBEDDED SYSTEMS WITH OPTIMISED PUBLIC KEY INFRASTRUCTURE

(71) Applicant: Microsec Pte Ltd, Singapore (SG)

(72) Inventors: Vishram Mishra, Singapore (SG); Magzhan Ikram, Singapore (SG); Steven Paul Kerrison, Singapore (SG); Shazina Binte Zaini, Singapore (SG); Ahnaf Aff Siddiqi, Singapore (SG)

(73) Assignee: Microsec Pte Ltd, Singapore (SG)

( * ) Notice: Subject to any disclaimer, the term of this patent is extended or adjusted under 35 U.S.C. 154(b) by 759 days.

(21) Appl. No.: 17/293,928

(22) PCT Filed: Jul. 31, 2019

(86) PCT No.: PCT/SG2019/050382
§ 371 (c)(1),
(2) Date: May 14, 2021

(87) PCT Pub. No.: WO2020/101567
PCT Pub. Date: May 22, 2020

(65) Prior Publication Data
US 2022/0006652 A1 Jan. 6, 2022

(30) Foreign Application Priority Data
Nov. 16, 2018 (SG) .............................. 10201810250P

(51) Int. Cl.
*H04L 29/06* (2006.01)
*H04L 9/32* (2006.01)

(52) U.S. Cl.
CPC ................................ *H04L 9/3263* (2013.01)

(58) Field of Classification Search
CPC ..... H04L 9/3263; H04L 9/006; H04L 9/3247; H04L 9/3268
See application file for complete search history.

(56) References Cited

U.S. PATENT DOCUMENTS

| 4,405,829 A | 9/1983 | Adleman et al. |
| 5,093,860 A | 3/1992 | Bright et al. |

(Continued)

FOREIGN PATENT DOCUMENTS

| JP | 2001069137 A | 3/2001 |
| JP | 2004173286 A | 6/2004 |

(Continued)

OTHER PUBLICATIONS

Holy el al., "Biometric ID cards at CTU in Prague," 2012 Second International Conference on Digital Information and Communication Technology and it's Applications (DICTAP), Bangkok, Thailand, 2012, pp. 245-249, doi: 10.1109/DICTAP.2012.6215384. (Year: 2012).*

(Continued)

*Primary Examiner* — Harunur Rashid
(74) *Attorney, Agent, or Firm* — Viering, Jentschura & Partner mbB

(57) ABSTRACT

Methods and apparatuses for data communication and cybersecurity are provided to handle the PKI over constrained devices with application over PAN/LP-WAN and other similar devices and networks. This significantly improves the security capabilities of such devices in terms of identity verification, encrypted communication, and device life-cycle management. The apparatus may authenticate a party of a data communication session using a micro certificate within a micro public key infrastructure that provides transport or application layer security. The micro public key infrastructure may be the combination of communication protocol, micro certificates, and a management platform.

(Continued)

The apparatus may establish the data communication session using the micro certificate. The apparatus may perform secured data communication over the data communication session.

18 Claims, 15 Drawing Sheets

(56) References Cited

U.S. PATENT DOCUMENTS

| | | | |
|---|---|---|---|
| 5,231,668 A | | 7/1993 | Kravitz |
| 6,252,960 B1 | | 6/2001 | Seroussi |
| 8,670,563 B2 | | 3/2014 | Natarajan |
| 10,305,695 B1 | | 5/2019 | Poltorak |
| 2004/0096055 A1 | | 5/2004 | Williams et al. |
| 2009/0249074 A1 | * | 10/2009 | Madhavan .......... H04L 9/3263 713/176 |
| 2010/0202616 A1 | * | 8/2010 | Peirce .................. H04W 4/44 380/270 |
| 2012/0137350 A1 | | 5/2012 | Baek et al. |
| 2012/0302265 A1 | * | 11/2012 | Lei ................. G01C 21/3697 455/466 |
| 2015/0289116 A1 | * | 10/2015 | Lei ...................... H04W 4/44 380/270 |
| 2016/0006723 A1 | | 1/2016 | Wilson |
| 2016/0105289 A1 | * | 4/2016 | Logue .................. H04L 67/12 713/175 |
| 2016/0156614 A1 | | 6/2016 | Jain et al. |
| 2016/0294828 A1 | * | 10/2016 | Zakaria ............ H04L 63/0876 |
| 2017/0118196 A1 | | 4/2017 | Ponsini et al. |
| 2017/0214529 A1 | | 7/2017 | Barbosa et al. |
| 2017/0279620 A1 | | 9/2017 | Boudett et al. |
| 2018/0060608 A1 | | 3/2018 | Holden |

FOREIGN PATENT DOCUMENTS

| | | |
|---|---|---|
| JP | 2009169171 A | 7/2009 |
| JP | 2018038036 A | 3/2018 |
| KR | 20090104421 A | 10/2009 |
| KR | 20130066024 A | 6/2013 |
| WO | 2017053048 A1 | 3/2017 |

OTHER PUBLICATIONS

Du et al., "Proceedings of the 2nd International Conference on Computer Science and Electronics Engineering (ICCSEE 2013)"; Published by Atlantis Press, Paris, France. pp. 1-4 (Year: 2013).*

LiPing Du et al., "Research on Micro-Certificate based Authentication Protocol" Proceedings of the 2nd International Conference on Computer Science and Electronics Engineering (ICCSEE 2013), Published by Atlantis Press, Paris, France., (Year: 2013).*

Holy, R. et al. "Biometric ID cards at CTU in Prague", dated 2012, pp. 245-249, IEEE.

Supplementary European Search Report issued for the corresponding European Application No. 19 88 5191.7, dated Jun. 29, 2022, 8 pages (only for informational purposes).

Tiwary, Aditya et al., "Internet of Things (IoT): Research, Architectures and Applications", International Journal on Future Revolution in Computer Sience & Communication Engineering, Mar. 2018, pp. 23-27, IJFRCSCE, vol. 4, Issue 3.

Koblitz, Neal, "Elliptic Curve Cryptosystems", Mathematics of Computation, Jan. 1987, pp. 203-209, American Mathematical Society, vol. 48, Issue 177.

Cooper, D. et al., "Internet X.509 Public Key Infrastructure Certificate and Certificate Revocation List (CRL) Profile", May 2008, 131 pages.

Johnson, Don et al., "The Elliptic Curve Digital Signature Algorithm (ECDSA)", International Journal of Information Security, Aug. 2001, 56 pages, certicom, vol. 1, Issue 1.

Rescorla, E. et al., "The Transport Layer Security (TLS) Protocol Version 1.3", Aug. 2018, 166 pages.

Eronen, P. et al., "Pre-Shared Key Ciphersuites for Transport Layer Security (TLS)", Dec. 2005, 16 pages, The Internet Society.

IEEE Standards, "Part 11: Wireless LAN Medium Access Control (MAC) and Physical Layer (PHY) specifications: Amendment 6: Medium Access Control (MAC) Security Enhancements", Jul. 23, 2004, 190 pages, IEEE Computer Society.

Adams, C. et al., "Understanding PKI: concepts, standards, and deployment considerations, Chapter 2—Public-Key Cryptography", 2003, 16 pages, Addison-Wesley Professional.

Merkle, Ralph C. et al., "Secure Communications Over Insecure Channels", Programming Techniques, Apr. 1978, pp. 294-299, Communications of the ACM, vol. 21, Issue 4.

Barker, Elaine et al., "Recommendation for Pair-Wise Key-Establishment Schemes Using Discrete Logarithm Cryptography", National Institute of Standards and Technology, Apr. 2018, 152 pages, Computer Security.

Lopez, Napier, "Edward Snowden claims American and British spies hacked into the world's largest SIM manufacturer", published Feb. 19, 2015, 5 pages, TNW News.

King, Brian, "A point compression method for elliptic curves defined over GF (2n)", Public Key Cryptography—PKC 2004, 2004, pp. 333-345, International Workshop on Public Key Cryptography.

Harkanson, R. et al., "Applications of Elliptic Curve cryptography", CISRC '17: Proceedings of the 12th Annual Conference on Cyber and Information Security Research, Apr. 2017, 7 pages, Oak Ridge, TN, USA.

Goyal, Tarun et al., "Energy Efficient Lightweight Cryptography Algorithms for IOT Devices", IETE Journal of Research, Nov. 2019, 16 pages.

Hammi, Mohamed et al., "A Lightweight IoT Security Protocol", Conference: 2017 1st Cyber Security in Networking Conference (CSNet), Oct. 2017, 9 pages, HAL archives-ouvertes.

Notice of Reasons for Refusal for corresponding Japanese patent application No. 2021-526464, dated Aug. 23, 2023, 4 pages (for informational purposes only).

Notice of Reasons for Refusal for corresponding Japanese patent application No. 2021-526464, dated Feb. 20, 2024, 3 pages (for informational purposes only).

* cited by examiner

METHOD AND ARCHITECTURE FOR SECURING AND MANAGING NETWORKS OF EMBEDDED SYSTEMS WITH OPTIMISED PUBLIC KEY INFRASTRUCTURE

CROSS-REFERENCE TO RELATED APPLICATION(S)

This application is a national stage entry according to 35 U.S.C. § 371 of PCT Application No. PCT/SG2019/050382 filed on Jul. 31, 2019; which claims priority to Singapore patent application Ser. No. 10/201,810250P, entitled "Method and Architecture for Securing and Managing Networks of Embedded Systems with Optimised Public Key Infrastructure" and filed on Nov. 16, 2018, all of which are expressly incorporated by reference herein in its entirety.

TECHNICAL FIELD

Various aspects of this disclosure generally relate to computer security, and more particularly, to a public key infrastructure for networks of embedded systems.

BACKGROUND

The Internet of things (IoT) is the network of devices such as vehicles and home appliances that contain electronics, software, actuators, and connectivity which allows these things to connect, interact and exchange data. The IoT involves extending Internet and other network connectivity beyond standard devices, such as desktops, laptops, smartphones and tablets, to any range of traditionally non-Internet enabled or non-network enabled physical devices and everyday objects. Embedded with technology, these devices can communicate and interact over the Internet or other network connections, and they can be remotely monitored and controlled.

The security of a given system or network is identified by its weakest link, for example a weak administrative password, lack of sufficient encryption, or poor physical security. With the emergence of large quantities of small, lower-power embedded end-points with network connectivity—a key element of the so-called Internet of Things (IoT)—these particular devices present such weak links. These devices have limited computing power and bandwidth, meaning typical cryptographic solutions cannot be directly applied. This either limits the uses of such devices, or results in compromises being made in whole-system security, due to this weak-point.

Computing systems require mechanisms for verifying the identity of devices and/or people operating them (parties, for brevity), and for providing secure exchange of data between parties. The objective is to ensure that two or more parties are the intended participants in an exchange of data, and that external observers cannot determine what data is exchanged, not corrupt that data without detection. This may be achieved through a variety of applied cryptographic techniques. Technologies such as embedded sensor nodes, personal monitoring devices and other devices that comprise the Internet of Things, may need to utilize such cryptographic techniques if they are to be trusted by users and can be used without detrimental effects to privacy and security.

Examples of traditional methods of providing security include pre-shared key (PSK), key management systems (KMS), and public key cryptography. Each is used to provide a means of encrypted data exchange, preventing unauthorized observers from knowing the contents of messages. A public key infrastructure (PKI) is an infrastructure that provide public key management. A PKI provides management of the public key cryptography.

PSK requires parties to agree on a shared secret or shared key that will be used for the basis of providing encryption using an appropriate encryption algorithm. A party in possession of the secret is implicitly authorized to participate as it is able to decrypt/encrypt messages that other parties send/receive. Further identity verification is not provided. If the shared key is guessed, stolen, or otherwise constructed by an unauthorized party, the security of the data exchanges is compromised.

KMS builds upon PSK by introducing more sophisticated methods of generating and sharing keys. A management system coordinates the keys used for communication. If each party has a unique key, it is uniquely identifiable. Assuming that managed keys are used by a smaller number of parties, the impact of a compromised key is lower than with PSK. However, KMS provides a central coordination point that, if compromised, is disastrous, and KMS is potentially subject to manipulation by a malicious insider who can control the KMS.

PKI provides significant enhancements over PSK and KMS through the use of key pairs. A key pair comprises a public and private part. The public part can be openly exchanged between parties and used for identity verification as well as encrypting data intended for the party in possession of the private part of the pair. The private part is kept secret by the party in possession of it. By exchanging public keys and associated digital certificates, two parties are able to identify each other and establish secure communication.

Typically, a public key is integrated into a certificate, which contains additional information on the party such as name, organization, and validity duration of the certificate. Certificates also contain a signature that is cryptographically generated. A change to any part of the certificate will result in the signature changing. A certificate authority (CA) can be made responsible for signing certificates, acting as a gatekeeper for the validity of the certificate. Signing chains can be created, where a root CA signs a certificate to an intermediate authority that the root CA gives permission to also sign certificates. Parties in possession of the CA's public key, and with the ability to receive any intermediate public keys and certificates can verify the integrity of any certificate that is presented to them.

The combination of public/private keys, certificates, signatures, CA, chains, and cryptographic verification provides a more robust mechanism for providing identify verification and secure data exchange. Any two parties always have a secure exchange of data that is unique to them. No party can masquerade as another, provided private keys are not compromised.

Cryptographic methods often involved in providing PKI include Rivest-Shamir-Adleman (RSA), elliptic curve cryptography (ECC), X.509 format certificates, digital signature algorithm (DSA), elliptic curve DSA (ECDSA) and the SSL/TLS protocol suite.

In addition to the above, once identity and secure communication is established using PKI, a further secure session can be established through a symmetric encryption mechanism, such as Diffie-Hellman key exchange (DHE) or ECC-based elliptic-curve Diffie-Hellman (ECDHE). These symmetric sessions can be ephemeral, in that the key used to secure them may not be based on the PKI keys. For example, perfect forward secrecy based ephemeral key has no direct relation with original PKI keys.

Traditional cryptographic solutions tend to be targeted towards Internet Protocol (e.g., IPv4/IPv6) networks. Such networks can accommodate large frames of data (e.g., 1500 bytes or more) and participating devices have ample processing power to process large data transfers and cryptographic algorithms. End-points in IoT networks are usually more constrained in both of these aspects. An example would be a sensor node based on an 8-bit microcontroller with LoRa (Long Range) transceiver. The device does not have enough computational capability to provide practical public key cryptography security; whereas the frame size of long range wide-area network (LoRaWAN) (e.g., 51-222 bytes) restricts the transmission of a typical X.509 certificate (on average 1.5 Kilobytes and potentially much larger) that would be used, even in its most compact Distinguished Encoding Rules (DER) binary format.

Because of these limitations, a traditional IoT device implements pre-shared key (PSK) based security where a single key is utilized throughout the network. If a single device/key is compromised, the entire network is compromised. To mitigate these, key management systems (KMS), where every single device in the network is assigned a unique key, may be used, but KMS suffer from drawbacks including scalability issues, insider attacks, and static key attacks. There are instances where such keys were stolen by means of hacks and inside jobs.

Therefore, there is a need for a new security mechanism that provides mutual authentication, end-to-end security, dynamic session key, updates on security policies (for instance certificate updates), and protection from other compromised devices in the network.

Constrained IoT devices running on low power computing resources (for instance AVR, ARM Cortex M0/M3/M4, TI MSP430, and other similar devices) communicating over constrained protocols like Bluetooth, Zigbee, LoRaWAN, LoRa, NBIoT, ZWave, etc. cannot perform application/transport/network layer by exchange of session keys with certificates and perfect forward secrecy in an effective way. One of the key concern is that, in a heterogeneous applications and environment, a single security protocol cannot be easily integrated, which leads to silos solution, which in turn is hard to manage and leads into security vulnerabilities. Another problem with such system is that commissioning, provisioning, updating and revocation of certificates remotely over the air is troublesome in remote systems.

Not only constrained devices have issues with scalability. In any network where a huge number of devices are deployed, traditional security scheme cannot scale and may hog up the network, leading to throughput bottlenecks. Also, as the number of devices grows, their lifecycle management and certificate management become a big issue.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, Micro-PKI technology is provided. Micro-PKI technology may enable public key infrastructure on resource and bandwidth constrained IoT devices. A certificate of size substantially smaller than a traditional X.509 certificate (e.g., less than 10% of the size of the traditional X.509 certificate) may be utilized to allow public key infrastructure to be deployed on IoT network platform. This certificate may be referred to as a micro certificate. To reduce the size of micro certificate, a point compression method and a lookup table-based scheme may be formulated. This scheme may utilize different fields in a micro certificate to provide information about the type of certificate and various parameters the certificate holds. Due to this, the micro certificate is not directly compatible with X.509 standard but may have the flexibility of co-existing with X.509, for example in infrastructures that combine traditional IT systems with segments IoT end-points. A protocol convertor may be utilized to convert from X.509 certificate to micro certificate and vice-versa. Similarly, with the protocol convertor, a Diffie-Hellman session can be also maintained across Micro-PKI and traditional PKI network. Since micro certificate utilizes similar cryptographic schemes as of X.509 (similar public-key size, similar ECC curves and similar hash algorithms), it may provide levels of security that are comparable to those possible with X.509 certificates.

In another aspect of the disclosure, a method, a computer readable medium, and an apparatus for data communication are provided. The apparatus may authenticate a party of a data communication session using a micro certificate within a micro public key infrastructure that provides transport or application layer security. The micro public key infrastructure may be the combination of communication protocol, micro certificates, and a management platform. At least one party of the data communication session may be a resource and/or bandwidth constrained device. In some embodiments, bandwidth constrained may correspond to a network technology where security features such as certificate exchange, key exchange and encrypted data adds a significant overhead versus the underlying data payload and rate at which payloads are sent. The apparatus may establish the data communication session using the micro certificate. The apparatus may perform secured data communication over the data communication session.

In yet another aspect of the disclosure, a method, a computer readable medium, and an apparatus for secured communication are provided. The apparatus may be a computing device. The apparatus may generate a micro certificate signing request. The apparatus may transmit the micro certificate signing request to a certificate authority. The apparatus may receive a response to the micro certificate signing request from the certificate authority. The apparatus may reconstruct a micro certificate signed by the certificate authority based on the response. The micro certificate may utilize elliptic-curve cryptography.

In yet another aspect of the disclosure, a method, a computer readable medium, and an apparatus for secured communication are provided. The apparatus may be a certificate authority. The apparatus may receive a micro certificate signing request from a computing device. The apparatus may generate a response to the micro certificate signing request. To generate the response, the apparatus may validate the micro certificate signing request, sign the micro certificate, and create the response based on the signed micro certificate. The apparatus may transmit the response to the computing device. A micro certificate signed by the apparatus may be reconstructed based on the response. The micro certificate may utilize elliptic-curve cryptography.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
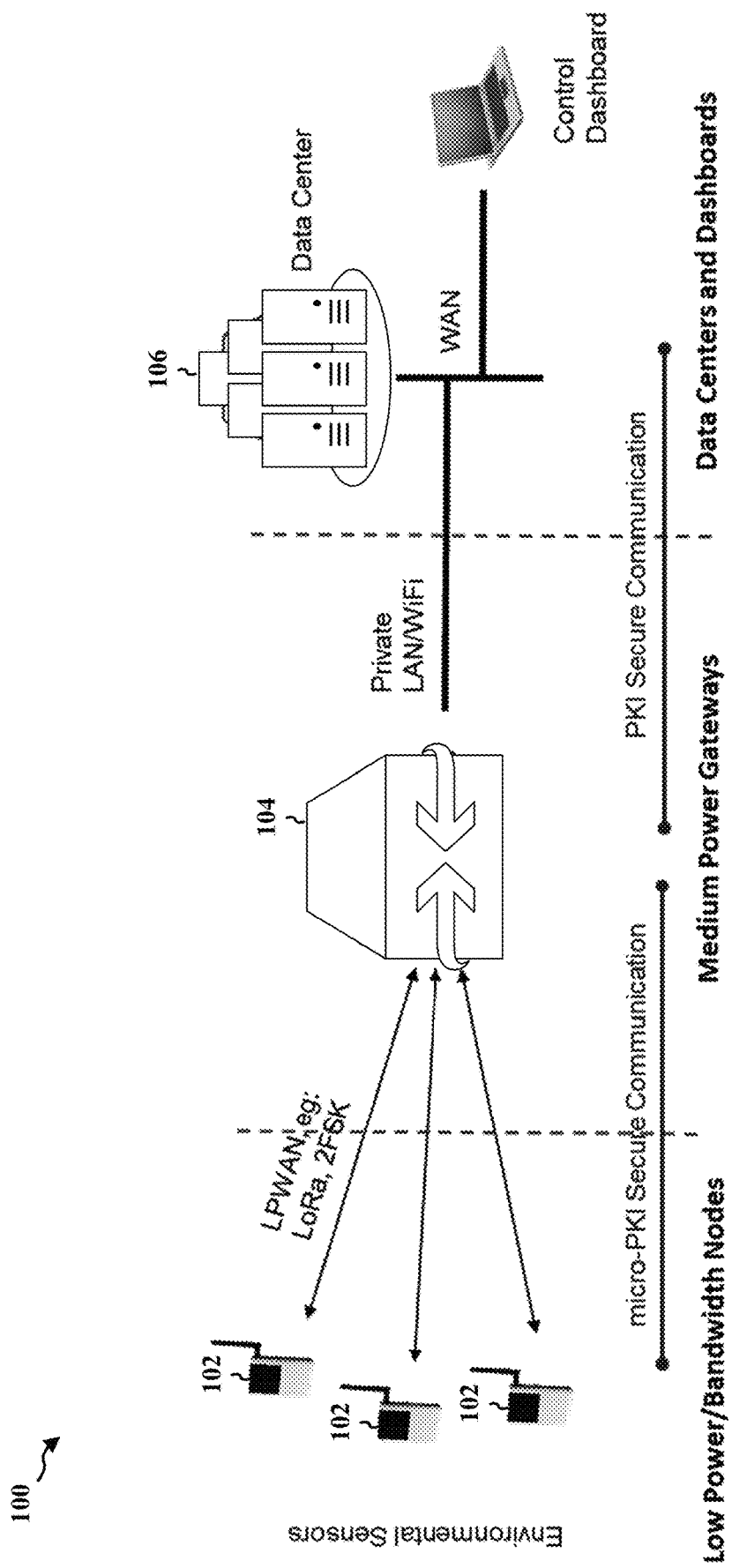
FIG. 1 is a diagram illustrating an example of a multi-tiered security architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a public key infrastructure for networks of embedded systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), Flash memory, optical disk storage, magnetic disk storage, other magnetic storage devices, combinations of the aforementioned types of computer-readable media, or any other medium that can be used to store computer executable code in the form of instructions or data structures that can be accessed by a computer.

The purpose of this disclosure is to provide remote devices with authentication, secure session, and security management capabilities. A small digital micro certificate may be used for either mutual or one-way authentication, and then it may be used to initiate a session with a unique key for encryption and decryption capability. The session may be provided in a tiered or end-to-end secure architecture. Security management component may realize the commission, management, update, and revocation of micro certificates on devices. Security management component may be also responsible for managing security.

Some embodiments of the disclosure provide a public key infrastructure for deeply-embedded devices that possess limited computing power and communicate over bandwidth-restricted and/or airtime-restricted networks. This significantly improves the security capabilities of such devices in terms of identity verification, encrypted communication, and device life-cycle management, when compared to traditional methods.

A primary objective of this disclosure is to reduce certificate lengths to a size that is easily usable of PAN (Personal Area Network), LP-WAN (Low-Power Wide Area Network), Body Area Network (BAN) type networks or similar networks, through a micro certificate design. In some embodiments, ECC may be used to achieve the primary objective. Another general objective of the disclosure is to use micro certificates and ECC as the basis for efficient PKI that may run on IoT devices (may be referred to as Micro-PKI). Further, a protocol is provided for the exchange of certificates, secure session creation, and other PKI-related activities. The protocol is designed to work efficiently on low-bandwidth PAN/LP-WAN/BAN networks or similar networks, with low-power IoT devices or similar devices. This protocol may be combined with a server-side architecture and enrolment protocol to achieve another objective of this disclosure—certificate and lifecycle management for IoT devices, with size-efficient certificate renewal method.

Micro-PKI technology may enable public key infrastructure on resource and bandwidth constrained IoT devices. A certificate of size substantially smaller than a traditional X.509 certificate (e.g., less than 10% of the size of the traditional X.509 certificate) may be utilized to allow public key infrastructure to be deployed on IoT network platform. This certificate may be referred to as a micro-certificate. To reduce the size of certificate, a point compression method and a lookup table-based scheme may be formulated. This scheme may utilize different fields in a micro certificate to provide information about the type of certificate and various parameters it holds. Due to this, the micro certificate is not compatible with X.509 standard but may have the flexibility of co-existing with X.509, for example in infrastructures that combine traditional IT systems with segments of IoT endpoints. A protocol convertor may be utilized to convert from X.509 certificate to micro certificate and vice-versa. Similarly, with the protocol convertor, a Diffie-Hellman session can be also maintained across Micro-PKI and traditional PKI network. Since micro certificate utilizes similar cryptographic schemes as of X.509 (e.g., similar public-key size, similar ECC curves, and similar hash algorithms), micro certificate may provide comparable levels of security to those possible with X.509 certificates.

To coordinate the security infrastructure, a management scheme may be provided that handles the operation of the entire security mechanism in the network. This includes providing information about the authenticated nodes in the network, their certificates and root certificate information. Management capabilities may include certificate revocation (black list) and certificate updates. A Certificate Enrolment Protocol (CEP) may be used to provision the first certificate inside the device while Automated Certificate Management Environment & System (ACMS) may be used to manage the certificates including updates and revocation.

Micro-PKI is able to offer greater security than PSK and similar approaches often used in constrained IoT devices by utilizing an optimized public key infrastructure. Each device may be issued a micro certificate that is unique. Instead of using a pre-shared key, the devices use unique and ephemeral session keys for data transmission. Session keys may be dynamically generated for each and every session and may be different from device to device. Thus, compromising a session key only compromises the particular session of that particular device. Similarly, compromising the private key of a device only affects a single device's traffic. Micro-PKI utilizes an Automated Certificate Management Environment, which allows remote updating of micro certificates by over-the-air commands. This allows provisioning, revocation, and updates of micro certificates. PKI has proven to be successful for large scale deployment as the entire secure Internet is currently based on it. Therefore, Micro-PKI may allow constrained IoT devices to be easily scaled and managed.

Micro-PKI may support two different architectures: multi-tiered security architecture and end-to-end security architecture. In multi-tiered security architecture, security exists between sensor and intermediaries, then between intermediaries and data/operation center. FIG. 1 is a diagram 100 illustrating an example of a multi-tiered security architecture. In the example, the multi-tiered security architecture may include two tiers: a first security tier between sensors 102 and a gateway 104, and a second security tier between the gateway 104 and a data center 106. Each of the communication pairs is secured using different methods. For instance, the communication between the sensors 102 and the gateway 104 is secured by utilizing Micro-PKI infrastructure, while the communication between the gateway 104 and the data center 106 is secured by utilizing X.509 certificate-based infrastructure. This form of communication security may be utilized when the sensors 102 and the gateway 104 are deployed on a private network or have a secure execution environment. Sensors 102 may also initiate secure connection with other sensors 102 through the use of Micro-PKI infrastructure. This ensures that in the machine-to-machine or peer-to-peer communication, edge devices are secured via Micro-PKI through the use of micro certificates. The physical and software security of the gateway 104 is pivotal to the integrity of the security implemented in both the Micro-PKI and the X.509 infrastructures.

Even though sensors are illustrated and described in the example above and throughout the disclosure, a person of ordinary skill in the art would recognize that any other IoT devices (e.g., actuators etc.) can be used instead without deviating from the purpose or objective of the disclosure.

Figure 2:
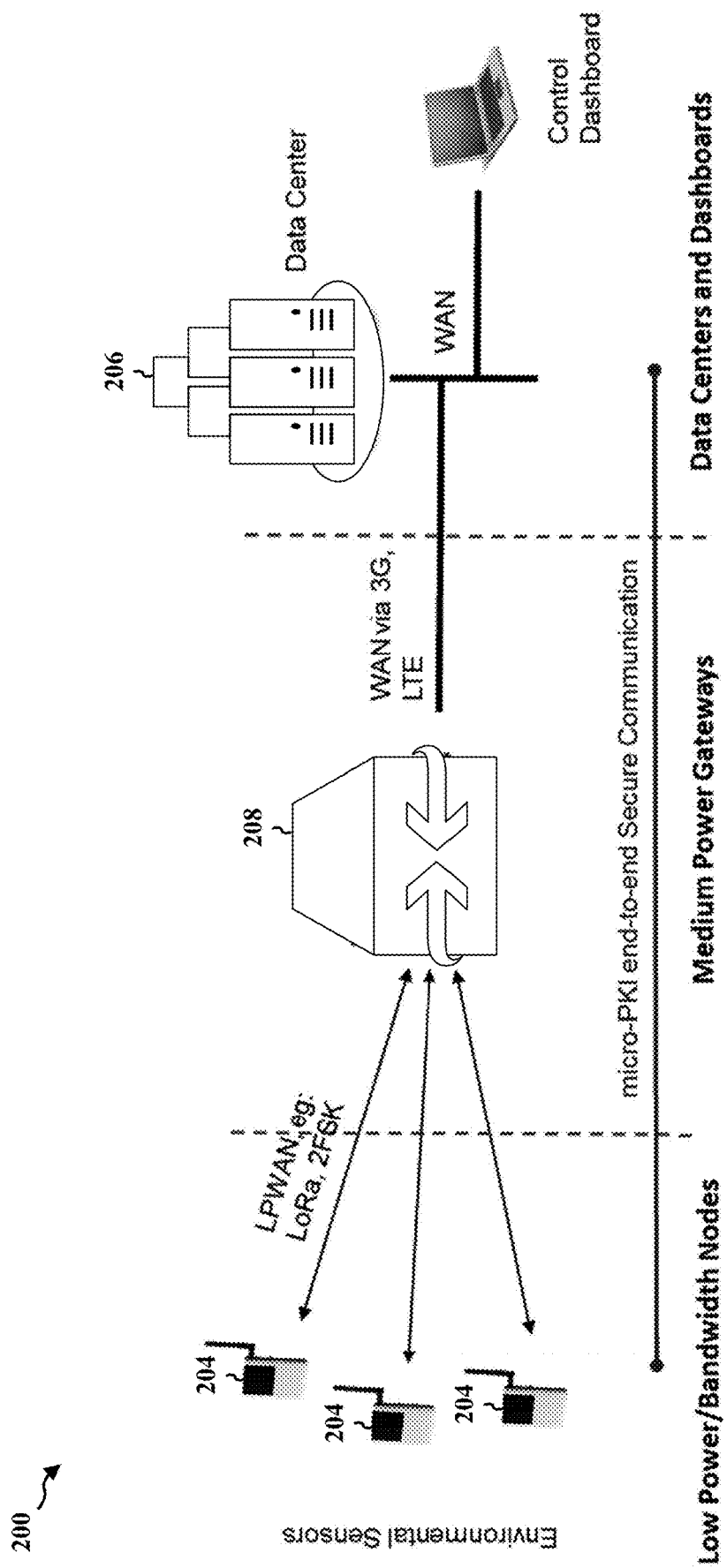
FIG. 2 is a diagram illustrating an example of an end-to-end security architecture.

FIG. 2 is a diagram 200 illustrating an example of an end-to-end security architecture. In the example, Micro-PKI is utilized between sensors 204 and a data centre 206. It implies that the data is secured all the way from the sensors 204 to the data centre 206. This form of communication security may be utilized when the sensors 204 or gateway 208 are deployed on a shared network, or when there are concerns over the security of intermediate devices responsible for transporting messages between end-points (e.g., the sensors 204) and the data centre 206, such as the gateway 208.

In some embodiments, Micro-PKI may be designed to slot into the software and hardware architectures of existing systems, providing its security benefits with minimal implementation effort. On embedded IoT devices, Micro-PKI may be integrated through a software development kit (SDK). The SDK may sit between the application code (e.g., sensor data collection) and the network communication code (e.g., wireless transmission). In doing so, the SDK may readily support a range of wireless technologies and IoT applications. The SDK can therefore be integrated easily with any existing application, as well as built into the software architecture of new applications. This positioning within the software architecture also makes Micro-PKI agnostic to any network-level security that is applied. Therefore, Micro-PKI may provide additional security alongside lower-level methods. It will be unaffected by any flaws that emerge in those lower-level security implementations, and may operate across multiple network technologies that do not otherwise share a common security implementation.

Figure 3:
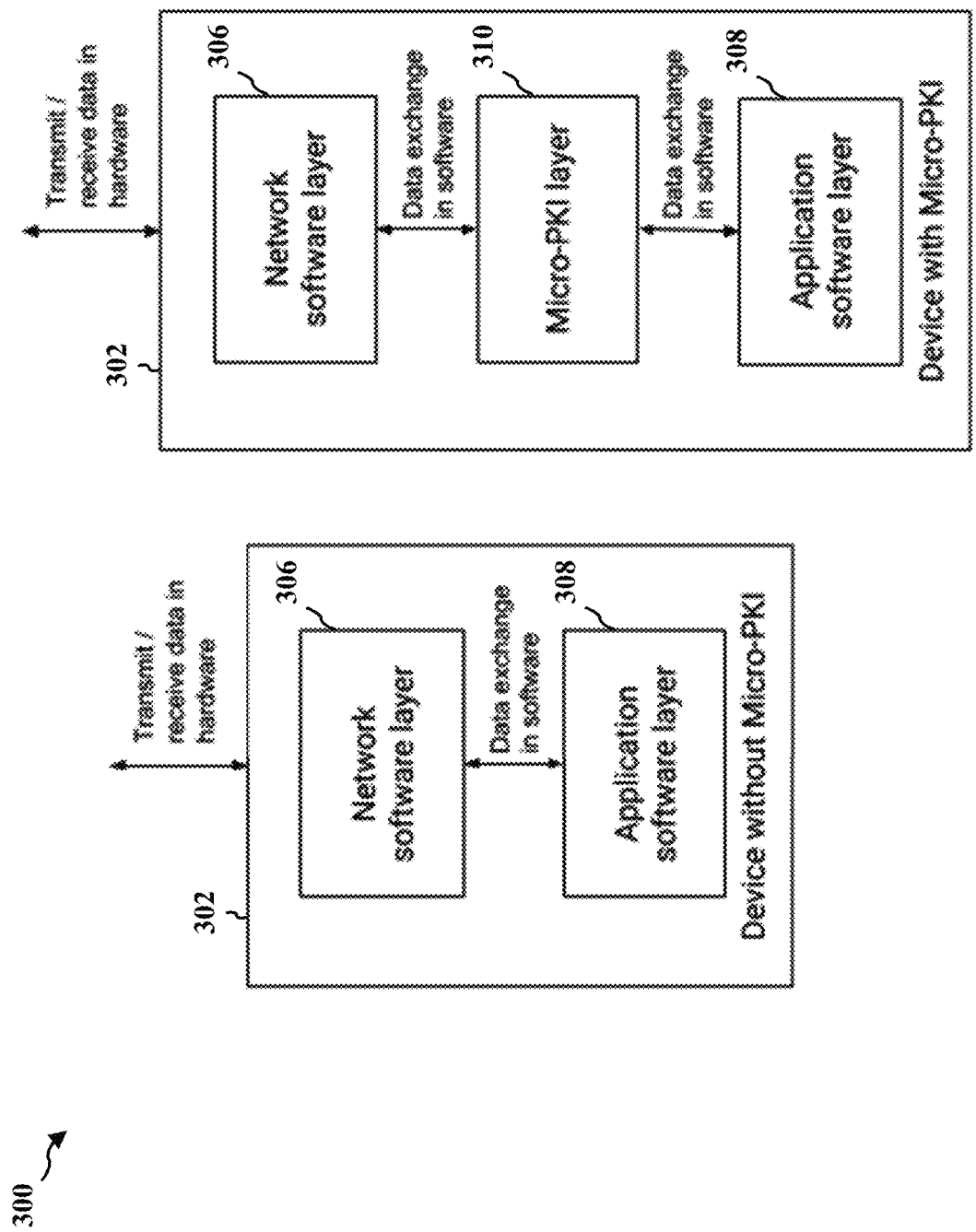
FIG. 3 is a diagram illustrating an example of Micro-PKI software development kit integration.

FIG. 3 is a diagram 300 illustrating an example of Micro-PKI SDK integration. In the example, a device 302 without Micro-PKI may include a network software layer 306 and an application software layer 308. Micro-PKI may be integrated into the device 302 via an SDK (e.g., a Micro-PKI layer 310). The Micro-PKI layer 310 may sit between the network software layer 306 and the application software layer 308.

Figure 4:
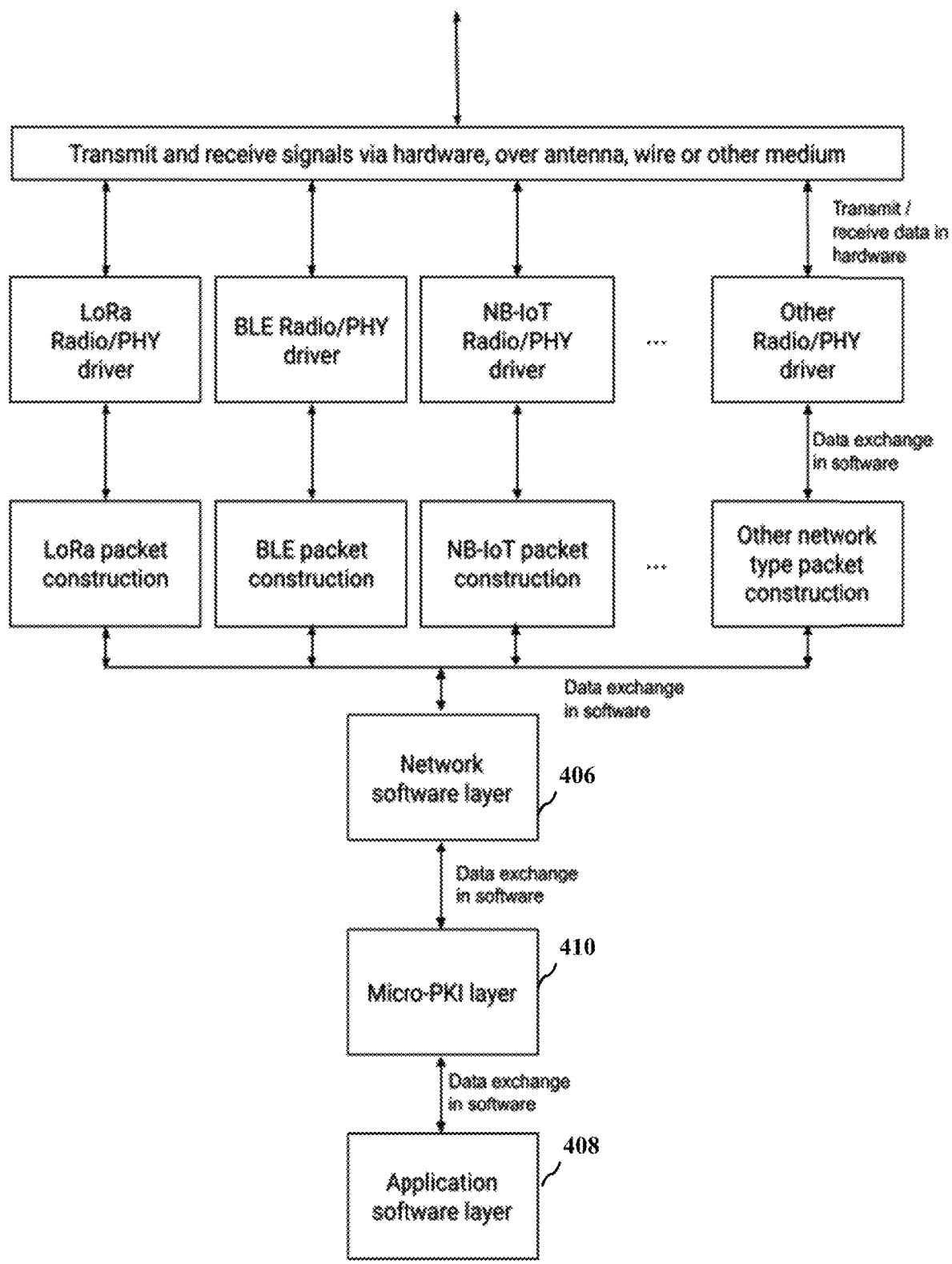
FIG. 4 is an expanded illustration of an example of Micro-PKI's integration with network technologies.

FIG. 4 is an expanded illustration of an example of Micro-PKI's integration with network technologies. In the example, Micro-PKI may be integrated into a device via an SDK (e.g., a Micro-PKI layer 410). The Micro-PKI layer 410 may sit between the network software layer 406 and the application software layer 408.

On the server-side, Micro-PKI may be integrated via a service. Messages may be directed to the service, by which responses may be generated and sent, or data may be encrypted/decrypted. The service may be designed to integrate closely with the data's point of utilization, for example where it is stored, analyzed, or transformed, which may be within the user's data centre, private cloud service, or IT system with equivalent sovereignty and security.

The Micro-PKI communication protocol is a network-agnostic design for exchanging messages between two parties in order to establish a secure session and send data over it. As with all other objectives of Micro-PKI, it is designed to minimize processing and network overhead.

Figure 5:
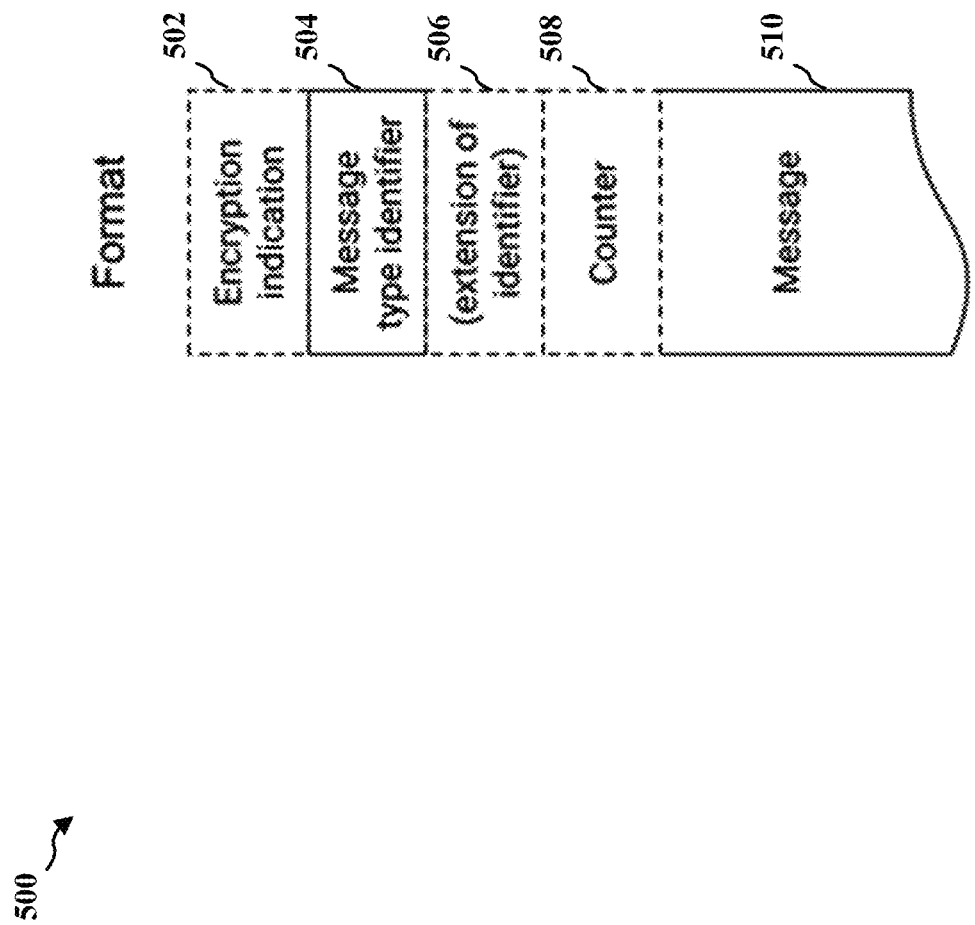
FIG. 5 is a diagram illustrating an example message format for the Micro-PKI communication protocol.

FIG. 5 is a diagram 500 illustrating an example message format for the Micro-PKI communication protocol. In the example, a packet of the Micro-PKI communication protocol may include a message type identifier field 504 and a message field 510. The message field 510 may have a payload of arbitrary length. The packet may optionally include an encryption indication field 502, an identifier extension field 506, and a counter field 508.

In some embodiments, the Micro-PKI communication protocol may achieve efficiency through a one-byte message type identifier field 504, through which other information can be inferred, thus minimizing header size. The message type identifier field 504 may denote what the contents of each packet is, uses of which may depend on the state of the session between two parties. The message type may include but is not limited to: certificate exchange, session key exchange, certificate signing, and other control-related messages. The message type identifier field 504 may not define the message length. The message contents themselves, for example certificate, may provide sufficient information to determine the message length, either through additional message-specific identifiers, or explicit length encoding. The underlying network's packet format may also specify length of the whole message, including headers, and so redundant encoding of lengths is minimized. To allow for future expansion, the message type identifier field 504 may be extendable through the identifier extension field 506.

Two optional fields may be specified: the encryption indication field 502 and the counter field 508. The encryption indication field 502 may allow the contents of messages to be encrypted to increase privacy in the setup of a secure session. The counter field 508 may assist in retransmission and message sequencing.

In some embodiments, the Micro-PKI does not require guaranteed delivery. The software interface to the Micro-PKI may allow reporting of zero received packets, for example after an application-appropriate and network-appropriate delay, and internally a decision is made whether retransmission of data or any change in state is required. If the underlying network does support guaranteed delivery, then Micro-PKI will benefit from it. Thus, the abstraction level at which Micro-PKI works may allow it to function in both lossy and lossless scenarios.

In some embodiments, Micro-PKI may support perfect forward security (PFS) where required. PFS de-couples the secure session from the certificates of the two communicating parties. A unique and ephemeral key-pair may be generated by each party, the public portion of which is shared, and may be used to derive a common shared secret without transmitting the secret itself. The parties' certificates are only used to sign the exchanged information to guarantee their origin and validity; the shared secret is not in any way related to the private key of either party.

The shared secret may then be used as the key for a symmetrically encrypted session, such as that provided by Advanced Encryption Standard (AES) block-cipher and stream-cipher algorithms, or comparable algorithms. The session duration, in terms of both time and amount of data sent, may be limited to minimize the opportunity for an attacker to guess or otherwise obtain the shared secret. The session duration, manually or automatically, can also be configured to minimize the power consumption of the IoT device. Even though the effort required to compromise the shared secret is prohibitively high, if such a compromise were to occur, it would only be applicable to that session. Any past or future sessions, which have their own ephemeral keys and shared secret, would remain protected, hence perfect forward secrecy is attained.

The shared secret may be maintained between the two communicating parties. Therefore, there is no key-management scaling issue, and the verification of communication is still provided through the PKI model. ECC may be used in ephemeral key exchange, keeping key size small and compatible with PAN/BAN/LP-WAN or other constrained networks, in a similar fashion to micro certificate.

Where PFS is not required, secure sessions may be established using alternate methods. A randomly generated shared-secret may be communicated between the parties, which is itself encrypted in transit by the recipient's public key. This secret is then used as the key for a secure symmetrically encrypted session.

In two-way communication, each party may contribute half of the shared-secret, constructing the whole secret from that received from the other party. In one-way communication (such as a sensor that can send, but not receive messages), the sender provides the secret and shares it securely using the receiver's public key, as previously described. In such cases, the end-point's certificate is static, as is the certificate of the receiver. Provided the receiving server's security is maintained, trust is preserved between the parties. Life-cycle management of devices remains possible, in that a device can be retired by no longer trusting its certificate, therefore ignoring communication from it.

Figure 6:
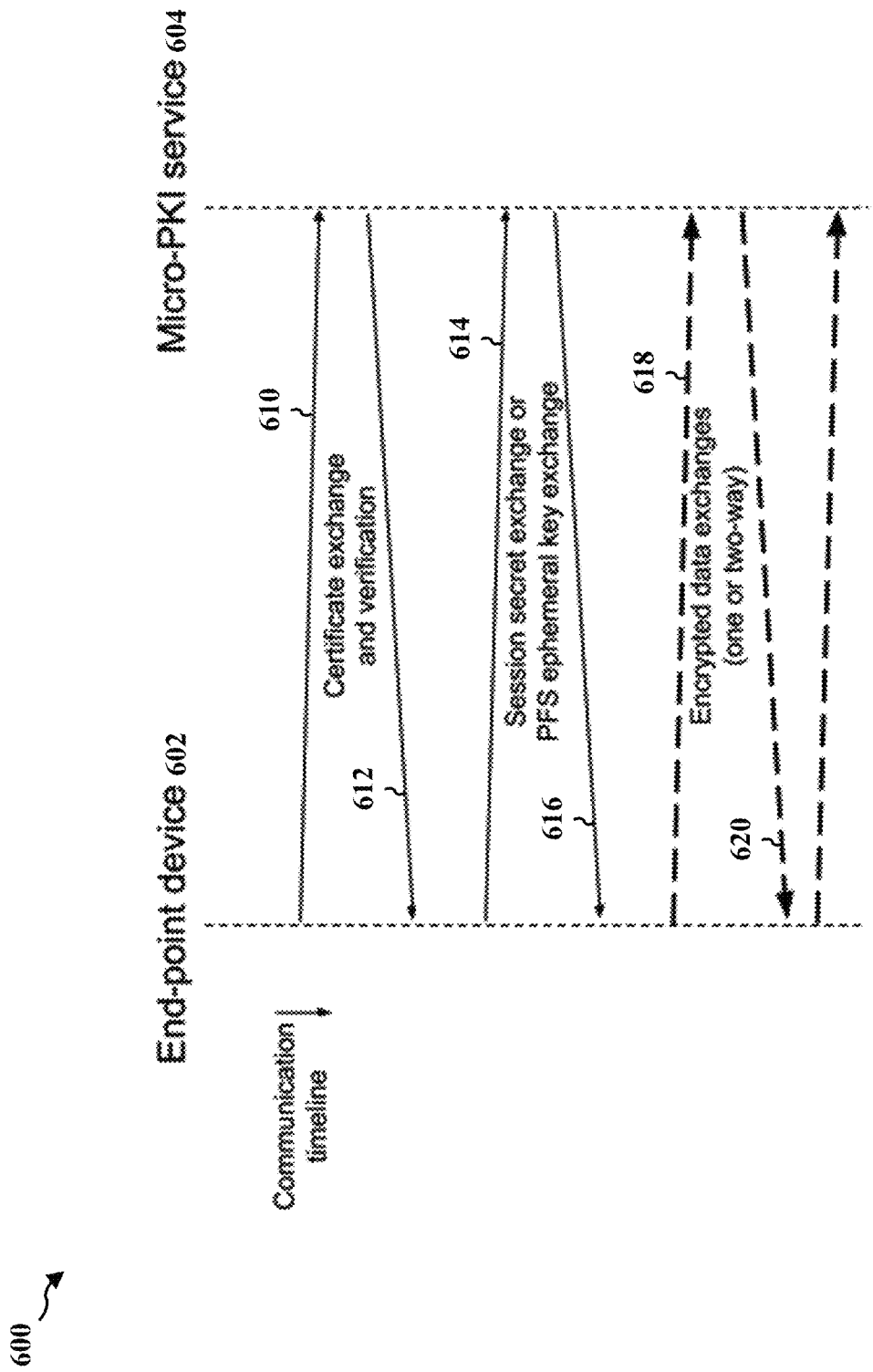
FIG. 6 is a diagram illustrating an example of information flow for the setup of a Micro-PKI secured session.

FIG. 6 is a diagram 600 illustrating an example of information flow for the setup of a Micro-PKI secured session. In the example, at 610 and 612, an end-point device 602 and a Micro-PKI service 604 may exchange and verify certificate. At 614 and 616, the end-point device 602 and the Micro-PKI service 604 may exchange session secret or PFS ephemeral key. At 618, the end-point device 602 may optionally send encrypted data to the Micro-PKI service 604. At 620, the Micro-PKI service 604 may optionally send encrypted data to the end-point device 602. The enumerated methods above demonstrate that through Micro-PKI's various modes of operation, it may cater to two-way and one-way communication scenarios, with trust in the parties being preserved, and with perfect forward secrecy where available.

In some embodiments, to begin using Micro-PKI, a device may need to be enrolled into the management system. The commissioner of the device, at the time it is programmed (either in the field or prior to shipping), installs a certificate into the device. The commissioning certificate may be limited in use, such that it may only be used to establish a secure session and perform a new CSR. The acceptance of this "first-use" CSR may be automated or managed manually via the management system.

In some embodiments, the Automated Certificate Management Environment is responsible for triggering the update of certificates, as well as handling revocations of old certificates. For Micro-PKI, the messages exchanged for ACMS must remain small, in keeping with the low-power, low-bandwidth requirements.

At the data center side, when a device's certificate is considered valid but expired (out of date), a renewal instruction may be sent to the device. The device may then generate a new key-pair and build a CSR, which may be returned to the data center server. The server may then communicate the CSR with the CA in order to validate and return the signed information to the device. Similarly, if the server's own certificate expires, it may follow the same mechanism of renewal with the CA. In addition to expiration-driven renewals, the management framework may be used to trigger renewal arbitrarily, for example in response to a change in security policy by the organization, or due to a concern about a given device.

Micro certificates may be remotely transmitted over-the-air (OTA) in a secure way to update security on a particular IoT device. Each device has the capability to generate its own private-public key pair, which then is passed as certificate signing request (CSR). This CSR is then passed to a certificate authority (CA) server that issues micro certificate on the basis of CSR. This new micro certificate is then installed back in the device. The CA may be accessed via an application programming interface (API), protected with access control mechanisms, and keys used in the cryptographic steps may be further protected by storage in a hardware security module or inside a secure element.

Figure 7:
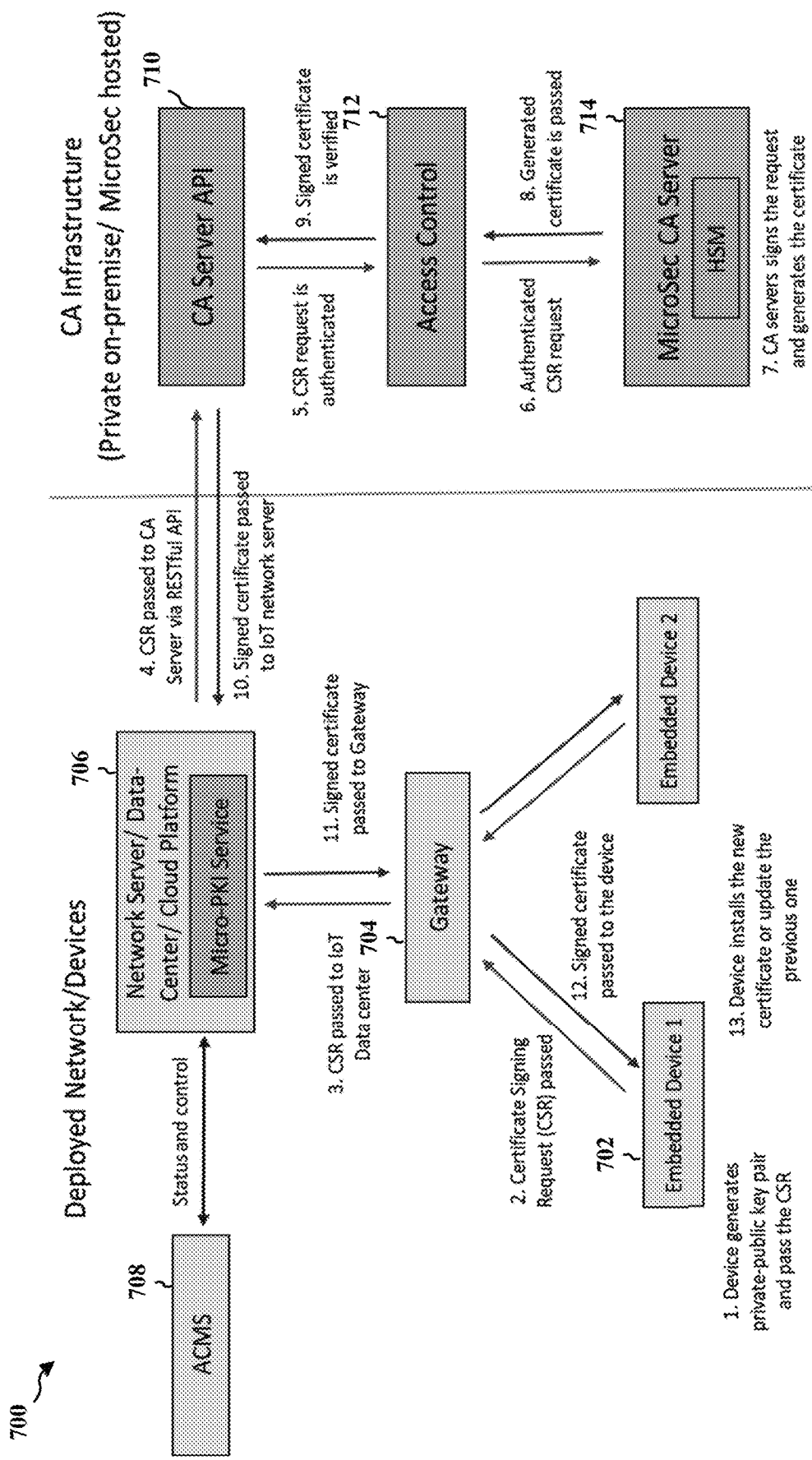
FIG. 7 is a diagram illustrating an architectural overview of Micro-PKI and Automated Certificate Management Environment.

FIG. 7 is a diagram 700 illustrating an architectural overview of Micro-PKI and ACMS. In FIG. 7, an example of the operation that happens in the background for the entire CSR request and response is illustrated. In the example, a device (e.g., the embedded device 702) may generate a private-public key pair and pass a corresponding CSR to gateway 704. The gateway 704 may pass the CSR to data center 706, which may provide Micro-PKI service. The data center 706 may exchange status and control information with ACMS 708.

The data center 706 may pass the CSR to a CA server API 710. The CA server API 710 may in turn pass the CSR to an access control module 712 to get the CSR authenticated. The authenticated CSR may be passed to a CA server 714. The CA server 714 may sign the CSR and generate the certificate. The generated certificate may be passed to the access control module 712 to get the signed certificate verified. The access control module 712 may then pass the signed certificate to the data center 706 via the CA server API 710. The data center 706 may pass the signed certificate to the gateway 704, which may in turn pass the signed certificate to the device (e.g., the embedded device 702). The device may install the new certificate or update the previous certificate.

Essential to the Micro-PKI's efficiency is the micro certificate. The format of the micro certificate may support multiple elliptic curve and signature types whilst maintaining a very small size compared to traditional certificate formats. A micro certificate may include: certificate identifier, issuer identifier, issue date, validity duration, device identifier, organization identifier, network identifier, ECC curve identifier, signature identifier, public key, and signature. A micro certificate may include additional parameters to support signing chains for intermediary CA servers.

In some embodiments, various identifiers in a micro certificate may be numeric, rather than text based, to minimize their size. In some embodiments, all identifiers may be sized appropriate to their purpose. This is counter to a normal certificate that is open-ended in terms of the size of many of its fields, which is not appropriate for IoT and similar use-cases. For ease of management and co-existence with traditional PKI, these identifiers may be mapped to text-based identifiers or their equivalents in other systems. This mapping may be maintained in the data center, avoiding placing any burden on devices or their low-bandwidth networks. In some embodiments, additional size reduction may be achieved through a point compression technique that performs compression on elliptic curve data points, which may optionally be used to represent the public key in micro certificates.

In some embodiments, a micro certificate signing request (Micro-CSR) may follow the same approach as the micro certificate, but forgoes the portions that will be provided by the CA, namely issuer, date, and duration. The Micro-CSR may retain a signature to verify that the creator of the Micro-CSR has generated a key-pair. Upon signing by a CA, the CA may optionally return a further optimized response, containing only portions necessary for the device to reconstruct the CA-signed certificate, avoiding the re-transmission of parts that the device already has in its possession.

Figure 8:
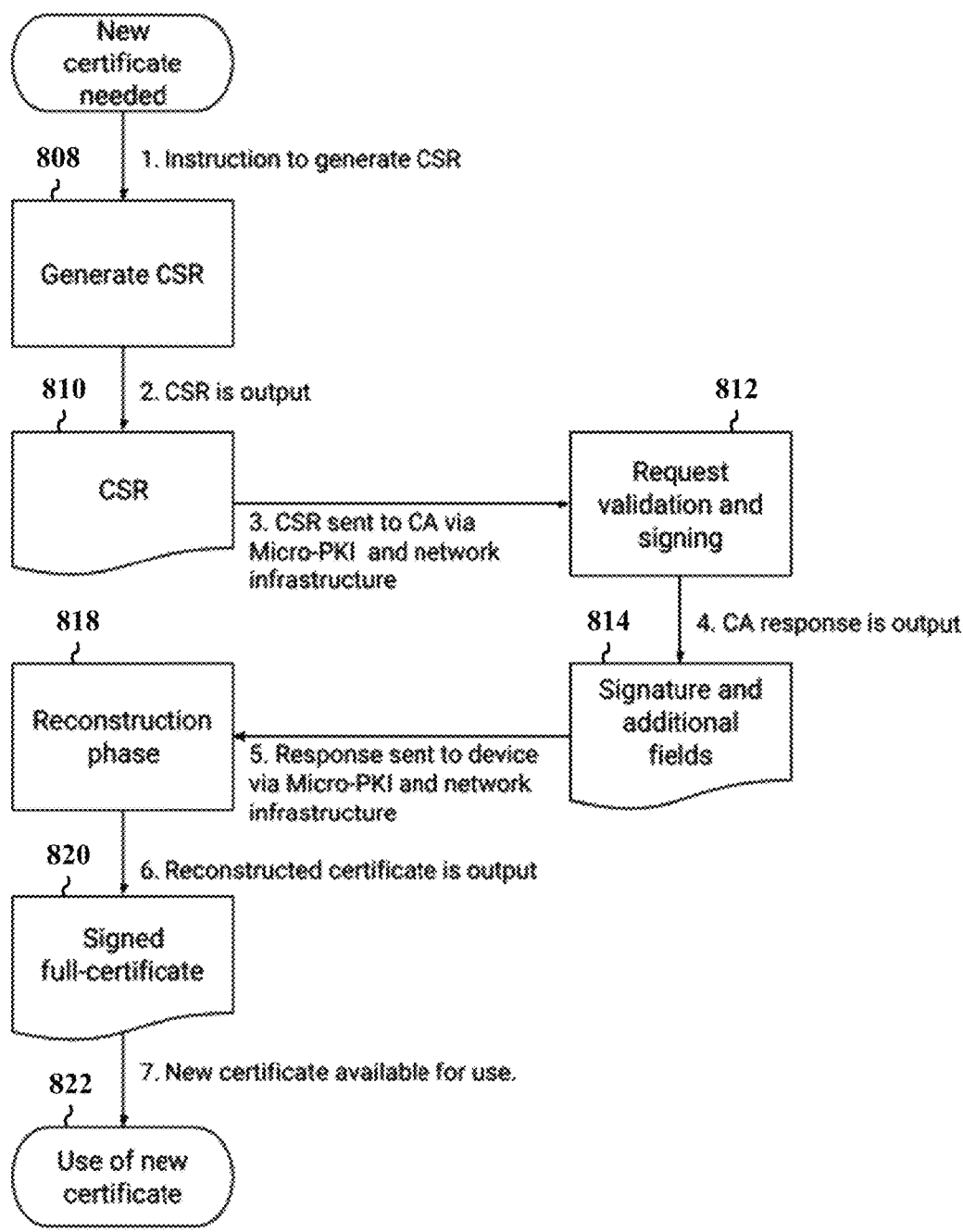
FIG. 8 is a diagram illustrating an example of micro certificate request and signing flow.

FIG. 8 is a diagram 800 illustrating an example of micro certificate request and signing flow. In the example, a device 802 requests a CA 804 to validate and sign a new micro certificate.

The device 802 may initiate the micro certificate request and signing procedure when it detects a need for a new certificate. At 808, the device 802 may generate a CSR 810. The device 802 may send the CSR 810 to the CA 804 via Micro-PKI and network infrastructure. At 812, the CA 804 may validate and sign the CSR to generate a response 814 to the CSR. The response 814 may include signature and additional fields. The CA 804 may send the response 814 to the device 802 via Micro-PKI and network infrastructure. At 820, the device 802 may reconstruct a signed full certificate 820 based on the response. At 822, the device 802 may use the new certificate 820 to ensure secure communication.

By using Micro-PKI, devices may be able to do application/transport/network layer security by exchange of session keys with certificates and perfect forward secrecy over constrained communication protocols like Bluetooth, Zigbee, LoRaWAN, LoRa, NBIoT, ZWave, etc. running on constrained devices with limited computation capabilities for example, AVR, ARM Cortex M0/M3/M4, TI MSP430, and other similar devices. Since the SDK is designed to be agnostic, it allows easy integration with any kind of embedded device, communicating over any kind of network. With the usage of ACMS, devices can be remotely commissioned, provisioned and updated with the new certificates, and existing certificates can be revoked as and when necessary.

In some embodiments, the applications of Micro-PKI are not limited to constrained devices and protocols. Instead, it may be extended to any device that needs optimization to increase the performance and throughput of the overall system. The technology may also be applied in places where certificate management system and life-cycle management system are needed. This also involves commissioning of certificates & keys and their management.

Figure 9:
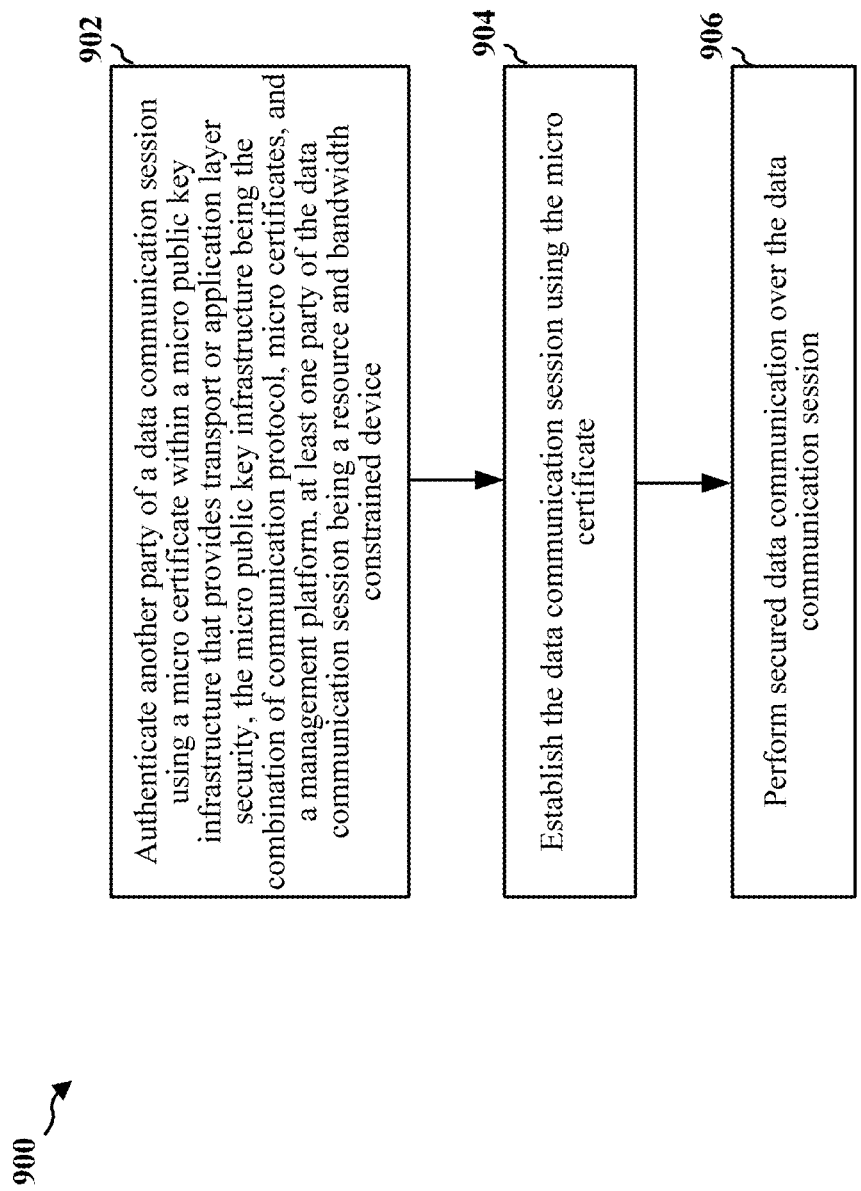
FIG. 9 is a flowchart of a method of data communication.

FIG. 9 is a flowchart 900 of a method of data communication. The method may be performed by an apparatus (e.g., apparatus 1102/1102' described below with reference to FIG. 11 or 12). In some embodiments, the apparatus may be a computing device that implements Micro-PKI protocol (e.g., the sensors 102, 204, the device 302, the end-point device 602, the embedded device 702, the device 802).

At 902, the apparatus may authenticate another party of a data communication session using a micro certificate within a micro public key infrastructure that provides transport or application layer security. The micro public key infrastructure may be the combination of communication protocol, micro certificates, and a management platform. At least one party of the data communication session may be a resource and bandwidth constrained device.

In some embodiments, bandwidth constrained may mean a network technology where security features such as certificate exchange, key exchange and encrypted data adds a significant overhead versus the underlying data payload and rate at which payloads are sent. In some embodiments, the data communication may be wired or wireless communication. In some embodiments, the micro public key infrastructure may be integrated through a Software Development Kit that sits between application code and network communication code.

At 904, the apparatus may establish the data communication session using the micro certificate. In some embodiments, activities related to the micro public key infrastructure may be carried out over a micro public key infrastructure communication protocol. Those activities may include certificate exchange, session key exchange, certificate signing, and control related messages. In some embodiments, the micro public key infrastructure communication protocol may define a packet including a one-byte identifier field and a message of arbitrary length.

At 906, the apparatus may perform secured data communication over the data communication session. In some embodiments, a plurality of identifiers in the micro certificate may be numeric. Each of the plurality of identifiers may be sized to a purpose of the identifier. In some embodiments, the micro certificate may include a public key. The public key may be based on elliptic-curve cryptography. The public key may be represented in the micro certificate using a point compression technique that performs compression on elliptic curve data points of the public key. In some embodiments, the size of micro certificate may be substantially smaller than traditional digital certificates such as X.509 certificate. In some embodiments, the micro certificate may use a micro-table-based scheme to reduce the size of the micro certificate. The micro-table-based scheme may utilize different fields in the micro certificate to provide information about the type of the micro certificate and various parameters the micro certificate holds.

Figure 10:
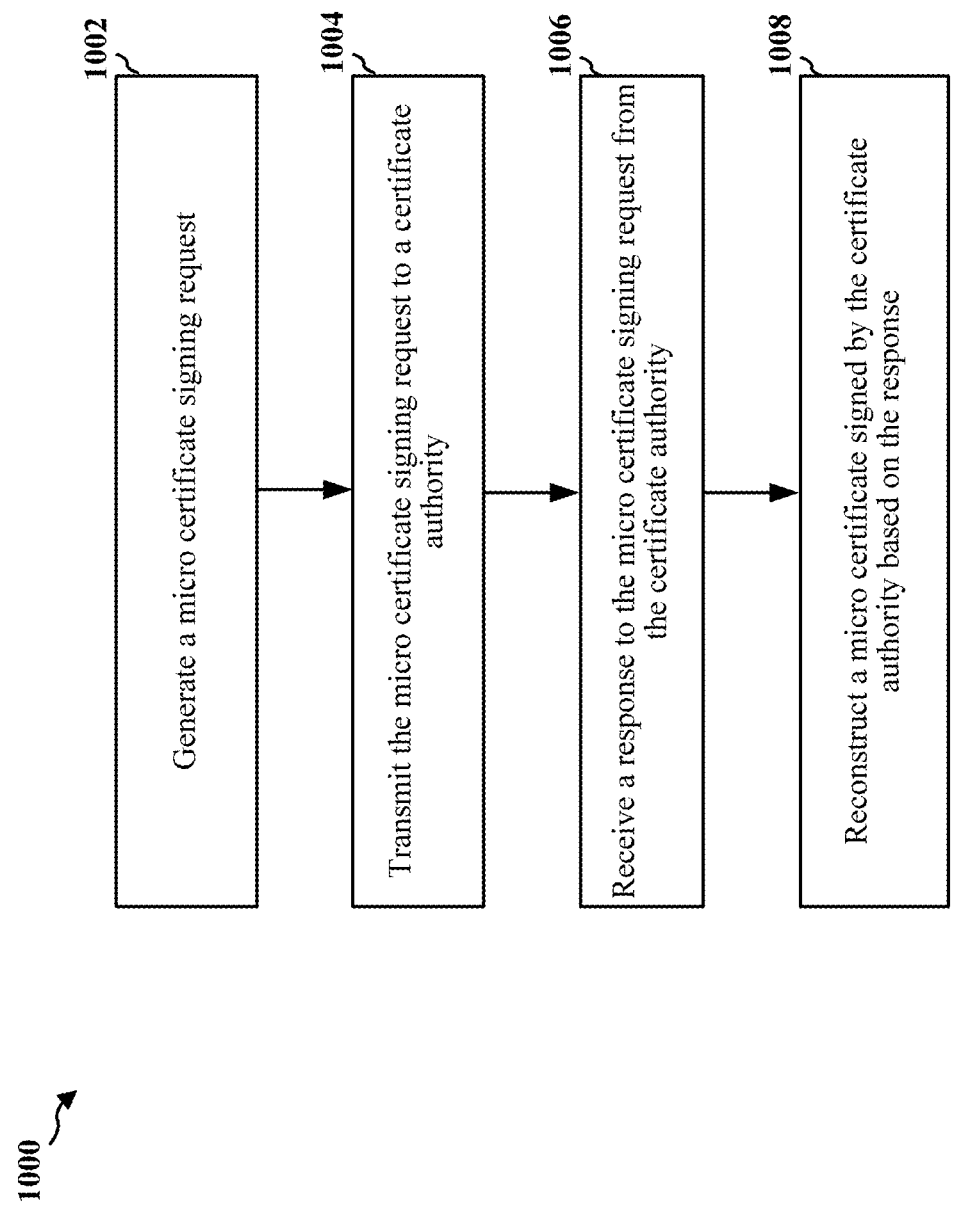
FIG. 10 is a flowchart of a method of micro certificate renewal.

FIG. 10 is a flowchart 1000 of a method of micro certificate renewal. The method may be performed by an apparatus (e.g., apparatus 1102/1102' described below with reference to FIG. 11 or 12). In some embodiments, the apparatus may be a computing device that implements Micro-PKI protocol (e.g., the sensors 102, 204, the device 302, the end-point device 602, the embedded device 702, the device 802). In some embodiments, the operations of the method may correspond to operations described above with reference to FIGS. 6-8.

At 1002, the apparatus may generate a micro certificate signing request. In some embodiments, a plurality of identifiers in the micro certificate may be numeric. Each of the plurality of identifiers may be sized to the purpose of the identifier. Each numeric identifier may be associated with more detailed information, which does not itself need to be stored within the certificate.

At 1004, the apparatus may transmit the micro certificate signing request to a certificate authority. In some embodiments, the micro certificate signing request may forgo a set of fields of the micro certificate that will be provided by the certificate authority. In some embodiments, the set of fields of the micro certificate may include one or more of issuer, date, or duration.

At 1006, the apparatus may receive a response to the micro certificate signing request from the certificate authority. In some embodiments, the response may forgo a set of fields of the micro certificate that is in the apparatus's possession.

At 1008, the apparatus may reconstruct a micro certificate signed by the certificate authority based on the response. The micro certificate may utilize elliptic-curve cryptography. In some embodiments, the micro certificate may include a public key. The public key may be represented in the micro certificate using a point compression technique that performs compression on elliptic curve data points.

Figure 11:
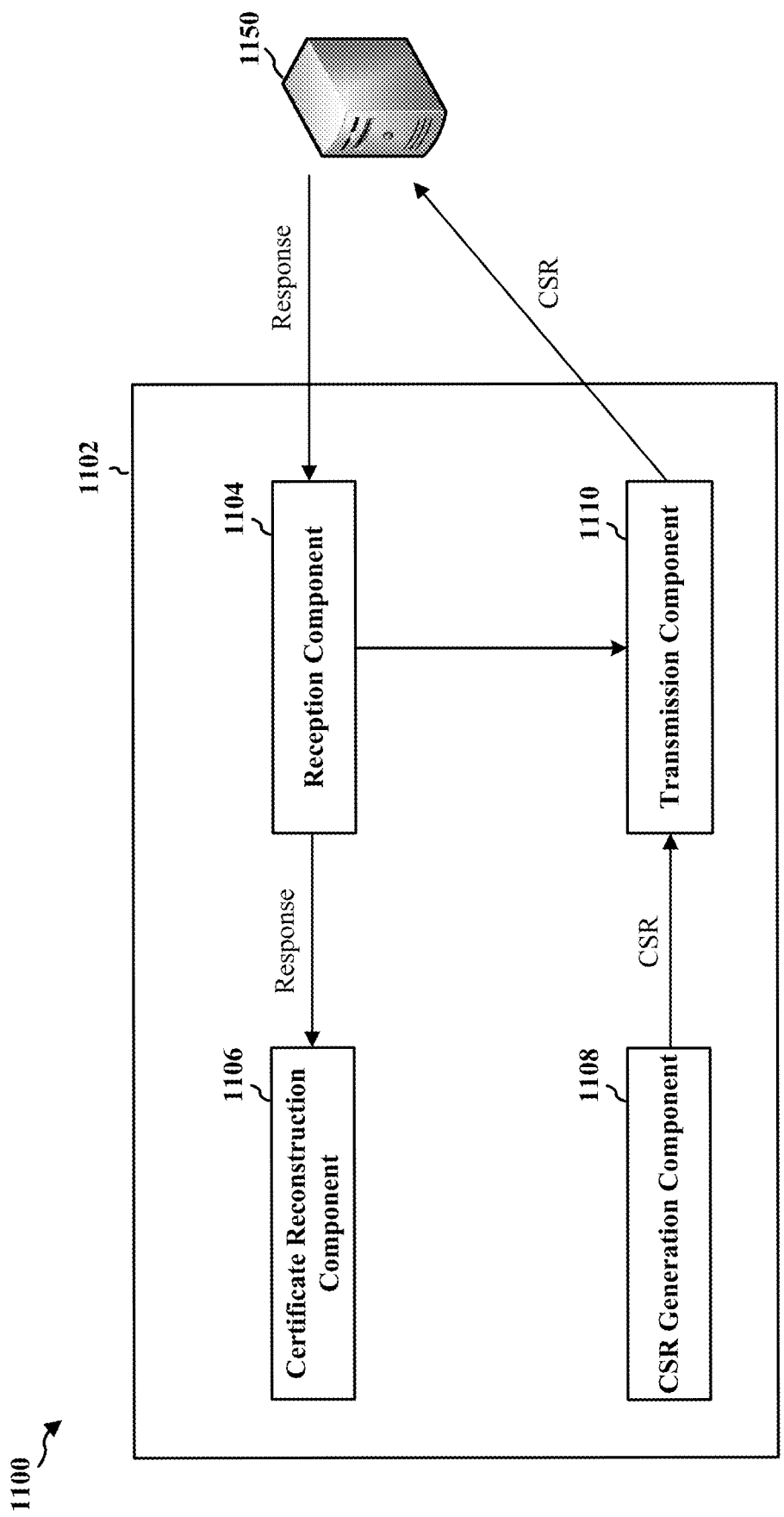
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus 1102 may be a computing device (e.g., the sensors 102, 204, the device 302, the end-point device 602, the embedded device 702, the device 802). The apparatus 1102 may include a reception component 1104 that receives response to CSR from a CA 1150. In one embodiment, the reception component 1104 may perform the operations described above with reference to 1006 in FIG. 10.

The apparatus 1102 may include a transmission component 1110 that transmits CSR to the CA 1150. In one embodiment, the transmission component 1110 may perform the operations described above with reference to 1004 in FIG. 10. The reception component 1104 and the transmission component 1110 may collaborate to coordinate the communication of the apparatus 1102.

The apparatus 1102 may include a certificate reconstruction component 1106 that is configured to reconstruct a micro certificate based on the response to CSR received from the reception component 1104. In one embodiment, the certificate reconstruction component 1106 may perform the operations described above with reference to 1008 in FIG. 10.

The apparatus 1102 may include a CSR generation component 1108 that is configured to generate CSR and provide the CSR to the transmission component 1110 for transmission to the CA 1150. In one embodiment, the CSR generation component 1108 may perform the operations described above with reference to 1002 in FIG. 10.

The apparatus 1102 may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
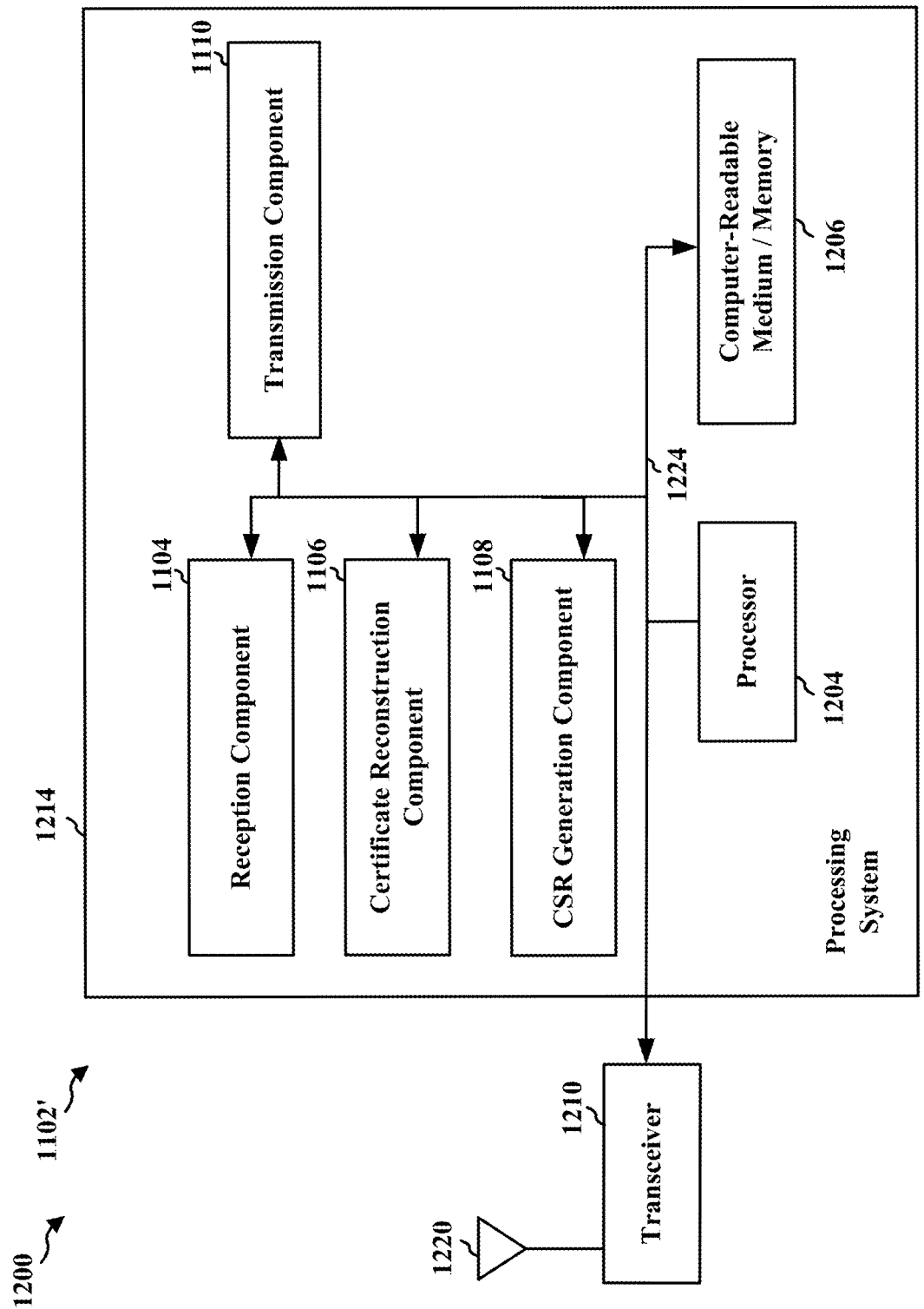
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. In one embodiment, the apparatus 1102' may be the apparatus 1102 described above with reference to FIG. 11. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, and the computer-readable medium/memory 1206. The bus 1224 may also link various other circuits such as timing sources, peripherals, voltage regulators, and power management circuits, which are well known in the art, and therefore, will not be described any further.

In some embodiments, the processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220. In other embodiments, the apparatus 1102' may connect via wired interface. In such embodiments, the apparatus 1102' does not include any transceiver or antenna.

The processing system 1214 includes a processor 1204 coupled to a computer-readable medium/memory 1206. The processor 1204 is responsible for general processing, including the analyzation of data gathered by the apparatus itself through its own sensors and the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110. The components may be software components running in the processor 1204, resident/stored in the computer readable medium/memory 1206, one or more hardware components coupled to the processor 1204, or some combination thereof.

Figure 13:
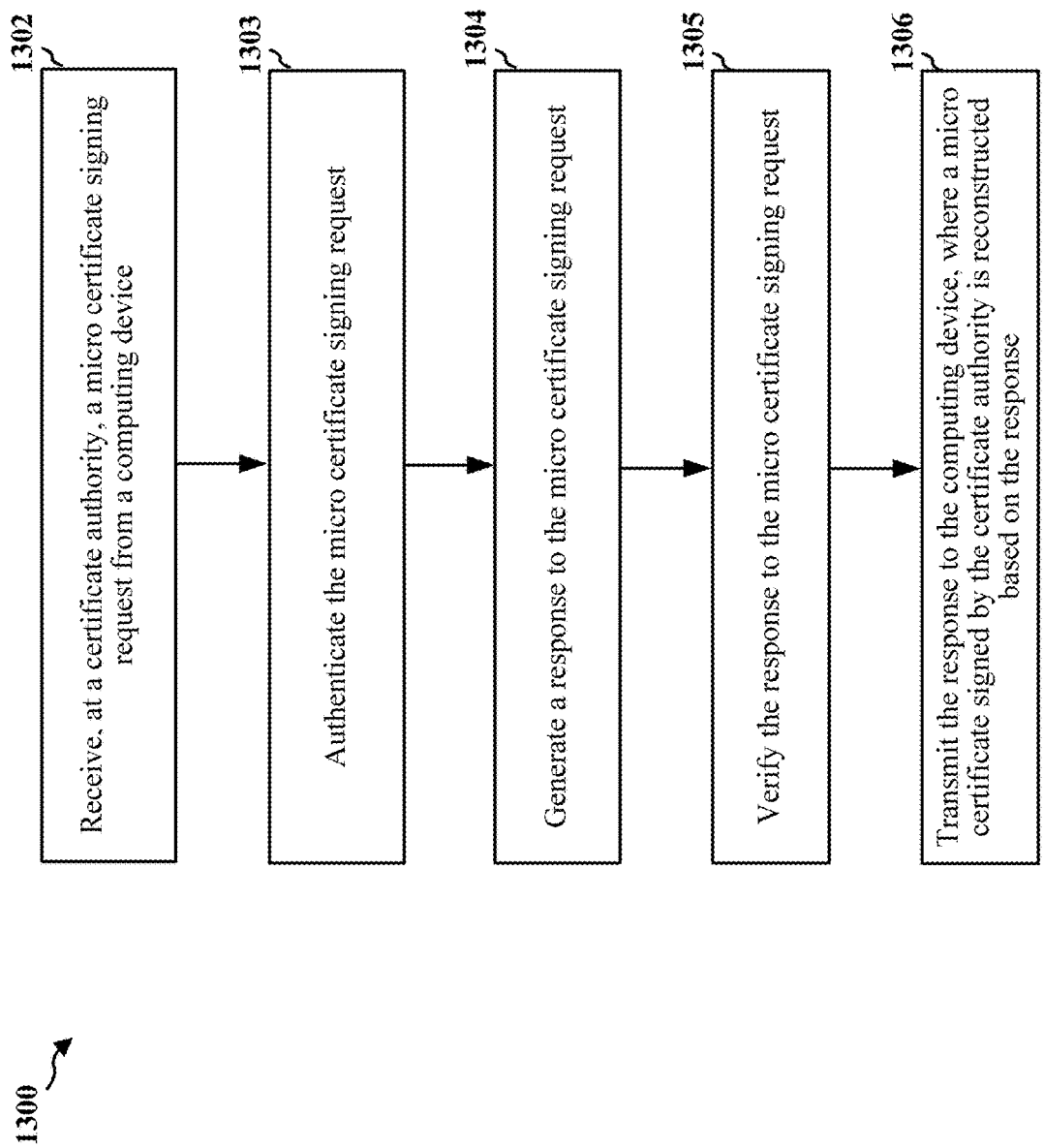
FIG. 13 is a flowchart of a method of certificate generation and processing.

FIG. 13 is a flowchart 1300 of a method of certificate generation and processing. The method may be a counterpart of the method described above in FIG. 10. The method may be performed by an apparatus (e.g., apparatus 1402/1402' described below with reference to FIG. 14 or 15). In some embodiments, the apparatus may be a server that includes one or more computing devices. In some embodiments, the apparatus may be a CA that implements Micro-PKI protocol (e.g., the device 302, the Micro-PKI service 604, the CA server 714, the CA 804). In some embodiments, the operations of the method may correspond to operations described above with reference to FIGS. 6-8.

At 1302, the apparatus may receive a micro certificate signing request from a computing device. In some embodiments, the micro certificate signing request may forgo a set of fields of the micro certificate that will be provided by the apparatus. In some embodiments, the set of fields of the micro certificate may include one or more of issuer, date, or duration.

In some embodiments, the micro certificate signing request may be received via a micro public key infrastructure communication protocol. The micro public key infrastructure communication protocol may define a packet including a one-byte identifier field and a message of arbitrary length. The one-byte identifier field does not define the length of the message.

At 1303, the apparatus may authenticate the micro certificate signing request. In some embodiments, the operation at 1303 may be performed by the access control module 712 described above with reference to FIG. 7.

At 1304, the apparatus may generate a response to the micro certificate signing request. In some embodiments, the response may forgo a set of fields of the micro certificate that is in the computing device's possession. In some embodiments, to generate the response, the apparatus may validate the micro certificate signing request, sign the micro certificate, and create the response based on the signed micro certificate.

At 1305, the apparatus may verify the response to the micro certificate signing request. In some embodiments, the operation at 1305 may be performed by the access control module 712 described above with reference to FIG. 7.

At 1306, the apparatus may transmit the response to the computing device. A micro certificate signed by the certificate authority may be reconstructed based on the response. The micro certificate may utilize elliptic-curve cryptography. In some embodiments, a plurality of identifiers in the micro certificate may be numeric. Each of the plurality of identifiers may be sized to the purpose of the identifier. In some embodiments, the micro certificate may include a public key. The public key may be represented in the micro certificate using a point compression technique that performs compression on elliptic curve data points.

Figure 14:
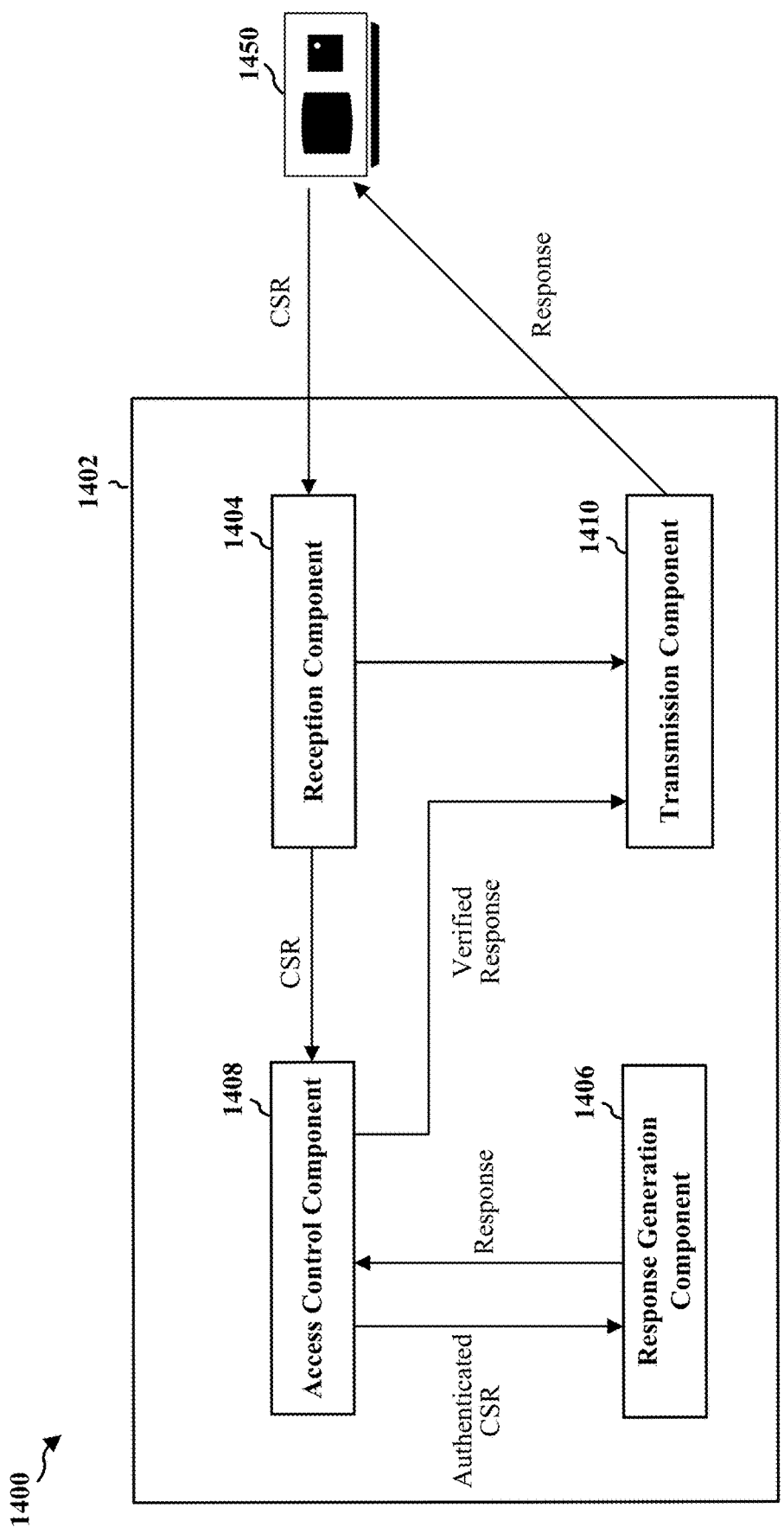
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus 1402 may be a CA that implements Micro-PKI protocol (e.g., the CA server 714, the device 302, the Micro-PKI service 604, the CA 804). The apparatus 1402 may include one or more computing devices. The apparatus 1402 may include a reception component 1404 that receives CSR from a computing device 1450. In some embodiments, the computing device 1450 may be the apparatus 1102/1102' described above in FIG. 11 or 12. In one embodiment, the reception component 1404 may perform the operations described above with reference to 1302 in FIG. 13.

The apparatus 1402 may include a transmission component 1410 that transmits a response to the CSR to the computing device 1450. In one embodiment, the transmission component 1410 may perform the operations described above with reference to 1306 in FIG. 13. The reception component 1404 and the transmission component 1410 may collaborate to coordinate the communication of the apparatus 1402.

The apparatus 1402 may include a response generation component 1406 that is configured to generate the response to the CSR. In one embodiment, the response generation component 1406 may perform the operations described above with reference to 1304 in FIG. 13.

The apparatus 1402 may include an access control component 1408 that is configured to authenticate the CSR received from the reception component 1404 before forwarding the CSR to the response generation component 1406. The access control component 1408 may be further configured to verify the response to the CSR generated by the response generation component 1406 and forward the verified response to the transmission component 1410. In one embodiment, the access control component 1408 may perform the operations described above with reference to 1303 or 1305 in FIG. 13.

The apparatus 1402 may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
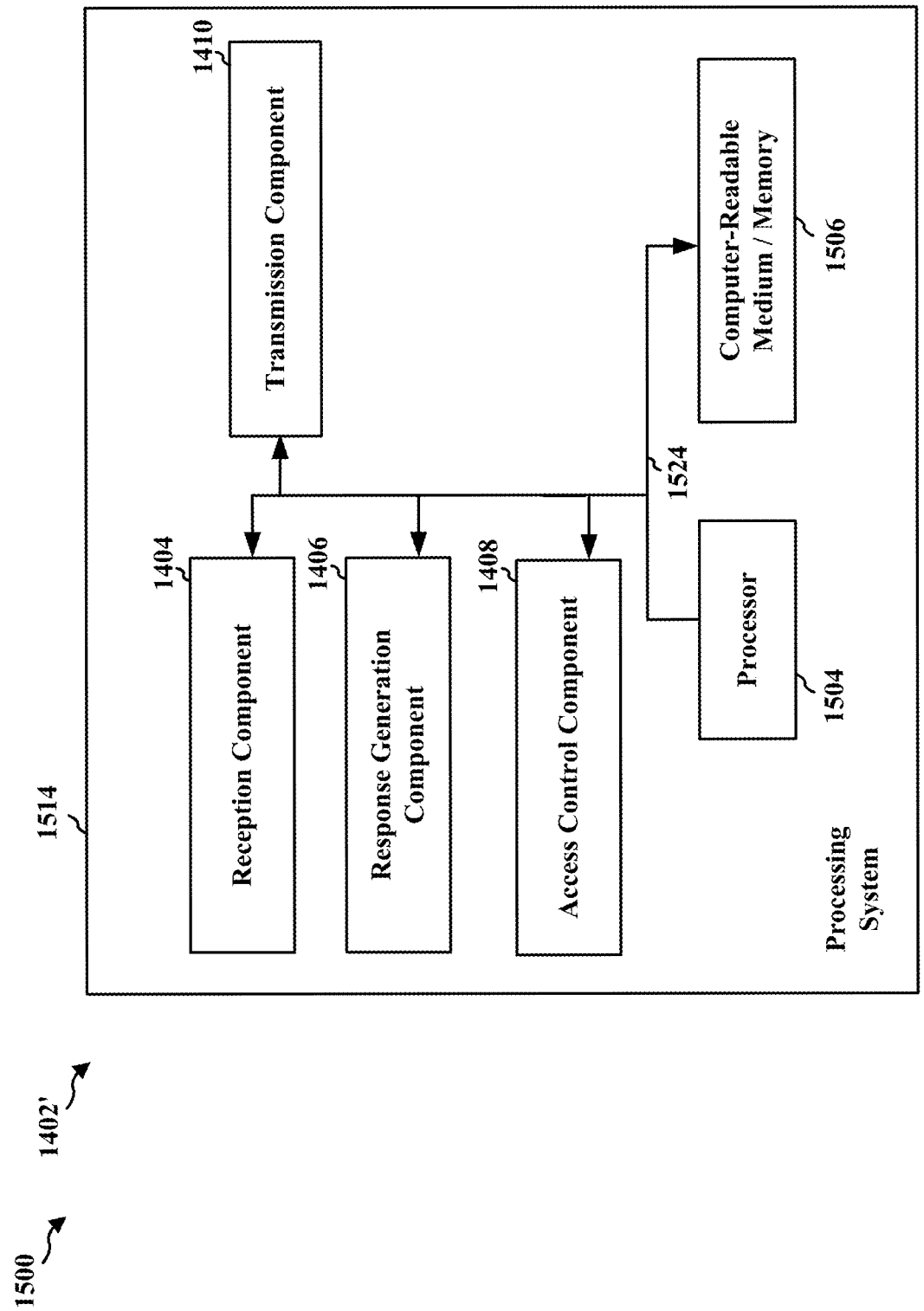
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. In one embodiment, the apparatus 1402' may be the apparatus 1402 described above with reference to FIG. 14. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, and the computer-readable medium/memory 1506. The bus 1524 may also link various other circuits such as timing sources, peripherals, voltage regulators, and power management circuits, which are well known in the art, and therefore, will not be described any further.

The processing system 1514 includes a processor 1504 coupled to a computer-readable medium/memory 1506. The processor 1504 is responsible for general processing, including the analyzation of data gathered by the apparatus itself through its own sensors and the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410. The components may be software components running in the processor 1504, resident/stored in the computer readable medium/memory 1506, one or more hardware components coupled to the processor 1504, or some combination thereof.

In the following, various aspects of this disclosure will be illustrated:

Example 1 is a method or apparatus for secured communication. The apparatus may be a computing device. The apparatus may generate a micro certificate signing request. The apparatus may transmit the micro certificate signing request to a certificate authority. The apparatus may receive a response to the micro certificate signing request from the certificate authority. The apparatus may reconstruct a micro certificate signed by the certificate authority based on the response. The micro certificate may utilize elliptic-curve cryptography.

In Example 2, the subject matter of Example 1 may optionally include that the micro certificate signing request may forgo a set of fields of the micro certificate that will be provided by the certificate authority.

In Example 3, the subject matter of Example 2 may optionally include that the set of fields of the micro certificate may include one or more of issuer, date, or duration.

In Example 4, the subject matter of any one of Examples 1 to 3 may optionally include that the response may forgo a set of fields of the micro certificate that is in the computing device's possession.

In Example 5, the subject matter of any one of Examples 1 to 4 may optionally include that a plurality of identifiers in the micro certificate may be numeric, where each of the plurality of identifiers may be sized to the purpose of the identifier, where each numeric identifier may be associated with more detailed information, which does not itself need to be stored within the certificate.

In Example 6, the subject matter of any one of Examples 1 to 5 may optionally include that the micro certificate may include a public key, where the public key may be represented in the micro certificate using a point compression technique.

In Example 7, the subject matter of any one of Examples 1 to 6 may optionally include that the micro certificate signing request may be transmitted to the certificate authority via a micro public key infrastructure communication protocol, where the micro public key infrastructure communication protocol defines a packet comprising a one-byte identifier field and a message of arbitrary length, where the one-byte identifier field does not define the length of the message.

Example 8 is a method or apparatus for secured communication. The apparatus may be a CA. The apparatus may receive a micro certificate signing request from a computing device. The apparatus may generate a response to the micro certificate signing request. The apparatus may transmit the response to the computing device. A micro certificate signed by the apparatus may be reconstructed based on the response. The micro certificate may utilize elliptic-curve cryptography.

In Example 9, the subject matter of Example 8 may optionally include that the micro certificate signing request may forgo a set of fields of the micro certificate that will be provided by the apparatus.

In Example 10, the subject matter of Example 9 may optionally include that the set of fields of the micro certificate may include one or more of issuer, date, or duration.

In Example 11, the subject matter of any one of Examples 8 to 10 may optionally include that the response may forgo a set of fields of the micro certificate that is in the computing device's possession.

In Example 12, the subject matter of any one of Examples 8 to 11 may optionally include that a plurality of identifiers in the micro certificate may be numeric, where each of the plurality of identifiers may be sized to the purpose of the identifier, where each numeric identifier may be associated with more detailed information, which does not itself need to be stored within the certificate.

In Example 13, the subject matter of any one of Examples 8 to 12 may optionally include that the micro certificate may include a public key, where the public key may be represented in the micro certificate using a point compression technique.

In Example 14, the subject matter of any one of Examples 8 to 13 may optionally include that the micro certificate signing request may be received via a micro public key infrastructure communication protocol, where the micro public key infrastructure communication protocol defines a packet including a one-byte identifier field and a message of arbitrary length, where the one-byte identifier field does not define the length of the message.

In Example 15, the subject matter of any one of Examples 8 to 14 may optionally include that, to generate the response, the apparatus may: validate the micro certificate signing request; sign the micro certificate; and create the response based on the signed micro certificate.

Example 16 is a method or apparatus for data communication. The apparatus may be a computing device. The apparatus may authenticate a party of a data communication session using a micro certificate within a micro public key infrastructure that provides transport or application layer security, the micro public key infrastructure being a combination of communication protocol, micro certificates, and a management platform, at least one party of the data communication session being a resource and bandwidth constrained device. The apparatus may establish the data communication session using the micro certificate. The apparatus may perform secured data communication over the data communication session.

In Example 17, the subject matter of Example 16 may optionally include that the micro public key infrastructure may be integrated through a Software Development Kit that sits between application code and network communication code.

In Example 18, the subject matter of Example 16 or 17 may optionally include that activities related to the micro public key infrastructure may be carried out over a micro public key infrastructure communication protocol, the activities comprising certificate exchange, session key exchange, certificate signing, and control related messages.

In Example 19, the subject matter of Example 18 may optionally include that the micro public key infrastructure communication protocol may define a packet comprising a one-byte identifier field and a message of arbitrary length.

In Example 20, the subject matter of any one of Examples 16 to 19 may optionally include that a plurality of identifiers in the micro certificate may be numeric, where each of the plurality of identifiers is sized to the purpose of the identifier.

In Example 21, the subject matter of any one of Examples 16 to 20 may optionally include that the micro certificate may include a public key, where the public key may be based on elliptic-curve cryptography, where the public key may be represented in the micro certificate using a point compression technique that performs compression on elliptic curve data points of the public key.

In Example 22, the subject matter of any one of Examples 16 to 21 may optionally include that the size of micro certificate may be substantially smaller than traditional digital certificates that include X.509 certificate.

In Example 23, the subject matter of any one of Examples 16 to 22 may optionally include that the micro certificate may use a micro-table-based scheme to reduce the size of the micro certificate, where the micro-table-based scheme may utilize different fields in the micro certificate to provide information about the type of the micro certificate and various parameters the micro certificate holds.

In Example 24, the subject matter of any one of Examples 16 to 23 may optionally include that the micro public key infrastructure may support perfect forward security.

In Example 25, the subject matter of any one of Examples 16 to 24 may optionally include that an Automated Certificate Management Environment and System may be used to remotely manage the micro certificate (e.g., commissioning, updates and revocation of the micro certificate).

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of data communication, the method comprising:
    authenticating a party of a data communication session using a micro certificate within a micro public key infrastructure that provides transport or application layer security, the micro public key infrastructure being a combination of communication protocol, micro certificates, and a management platform, at least one party of the data communication session being a resource and bandwidth constrained device;
    establishing the data communication session using the micro certificate; and
    performing secured data communication over the data communication session,
    wherein the authenticating comprises:
        receiving, at a server of the micro public key infrastructure, a micro certificate signing request from said party, the micro certificate signing request generated by said party;

transmitting, by the server of the micro public key infrastructure, the micro certificate signing request to a certificate authority;

receiving, at the server of the micro public key infrastructure, a response to the micro certificate signing request from the certificate authority; and transmitting the response from the server of the micro public key infrastructure to said party, said party configured to reconstruct the micro certificate based on the response and installing the micro certificate or updating a previous micro certificate, wherein the micro certificate uses a micro-table or lookup-table based scheme to reduce a size of the micro certificate, wherein the micro-table or lookup-table based scheme utilizes different fields in the micro certificate to provide information about a type of the micro certificate and various parameters the micro certificate holds, wherein the micro certificate is not directly compatible with an X.509 standard, wherein a plurality of identifiers in the micro certificate is numeric whose meaning is stored outside of the micro certificate, wherein each of the plurality of identifiers is sized to a purpose of the identifier.

2. The method of claim 1, further comprising integrating the micro public key infrastructure through a Software Development Kit (SDK) that sits between application code and network communication code.

3. The method of claim 1, further comprising carrying out activities related to the micro public key infrastructure over a micro public key infrastructure communication protocol, wherein the activities comprise certificate exchange, session key exchange, certificate signing, and control related messages.

4. The method of claim 3, wherein the micro public key infrastructure communication protocol defines a packet comprising a one-byte identifier field and a message of arbitrary length.

5. The method of claim 1, wherein the micro certificate comprises a public key, wherein the public key is based on elliptic-curve cryptography, wherein the public key is represented in the micro certificate using a point compression technique that performs compression on elliptic curve data points of the public key.

6. The method of claim 1, wherein the size of micro certificate is substantially smaller than traditional digital certificates that include X.509 certificate.

7. The method of claim 1, further comprising remotely managing commissioning, updates and revocation of the micro certificate using an Automated Certificate Management Environment and System (ACMS).

8. The method of claim 1, further comprising:
receiving, at a computer device, the response to the micro certificate signing request from the certificate authority; and reconstructing, by the computer device, the micro certificate signed by the certificate authority based on the response, the micro certificate utilizing elliptic-curve cryptography.

9. The method of claim 8, wherein the micro certificate signing request forgoes a set of fields of the micro certificate that are configured to be provided by the certificate authority, wherein the set of fields of the micro certificate comprises one or more of issuer, date, or duration.

10. The method of claim 8, wherein the micro certificate comprises a public key, wherein the public key is represented in the micro certificate using a point compression technique.

11. The method of claim 8, wherein the micro certificate signing request is transmitted to the certificate authority via a micro public key infrastructure communication protocol, wherein the micro public key infrastructure communication protocol defines a packet comprising a one-byte identifier field and a message of arbitrary length, wherein the one-byte identifier field does not define a length of the message.

12. The method of claim 8, wherein the response forgoes a set of fields of the micro certificate that is in the possession of the computing device.

13. The method of claim 1, further comprising:
receiving, at the certificate authority, the micro certificate signing request;
generating, by the certificate authority, the response to the micro certificate signing request; and
transmitting the response by the certificate authority, wherein the micro certificate signed by the certificate authority is reconstructed based on the response, the micro certificate utilizing elliptic-curve cryptography.

14. The method of claim 13, wherein the micro certificate signing request forgoes a set of fields of the micro certificate that will be provided by the certificate authority, wherein the set of fields of the micro certificate comprises one or more of issuer, date, or duration, wherein the response forgoes a set of fields of the micro certificate that is in the possession of the computing device.

15. The method of claim 13, each numeric identifier is associated with more detailed information, which does not itself need to be stored within the micro certificate.

16. The method of claim 13, wherein the micro certificate comprises a public key, wherein the public key is represented in the micro certificate using a point compression technique.

17. The method of claim 13, wherein the generating of the response comprises:
validating the micro certificate signing request;
signing the micro certificate; and
creating the response based on the signed micro certificate.

18. The method of claim 1, wherein the authenticating further comprises mapping each of the plurality of identifiers to its corresponding meaning, and wherein the mapping is maintained in the server of the micro public key infrastructure.

* * * * *